(12) United States Patent
Robins et al.

(10) Patent No.: US 11,741,933 B1
(45) Date of Patent: Aug. 29, 2023

(54) ACOUSTIC SIGNAL CANCELLING

(71) Applicant: DAZN Media Israel Ltd., Hertsliya (IL)

(72) Inventors: Eder Robins, Ramat Ha-Sharon (IL); Igor Lvovsky, Ein Emeq (IL); Shay Efrati, Hadera (IL); Guy Zisman, Kibutz Sdot Yam (IL); Andrew Younan, Haifa (IL); Gad Geffen, Matan (IL); Amir Shimoni, Gan Yoshiya (IL); Amir Segev, Even Yehuda (IL)

(73) Assignee: DAZN MEDIA ISRAEL LTD., Herzliya (IL)

( * ) Notice: Subject to any disclaimer, the term of this patent is extended or adjusted under 35 U.S.C. 154(b) by 0 days.

(21) Appl. No.: 17/693,585

(22) Filed: Mar. 14, 2022

(51) Int. Cl.
*G10K 11/178* (2006.01)
*G10L 21/0208* (2013.01)

(52) U.S. Cl.
CPC .. *G10K 11/17827* (2018.01); *G10K 11/17823* (2018.01); *G10K 11/17853* (2018.01); *G10L 21/0208* (2013.01); *G10L 2021/02082* (2013.01)

(58) Field of Classification Search
None
See application file for complete search history.

(56) References Cited

U.S. PATENT DOCUMENTS 10,979,477 B1  4/2021  Cabrido et al.
2011/0246908 A1  10/2011  Akram et al.
2012/0311043 A1  12/2012  Chen et al.
2015/0120336 A1  4/2015  Grokop et al.
2015/0134724 A1  5/2015  Hao et al.
2016/0174010 A1  6/2016  Mohammad et al.
2016/0269771 A1  9/2016  Bangma et al.

(Continued)

FOREIGN PATENT DOCUMENTS

EP    3304541 A1    4/2018
GB    2575873 A  *  1/2020

(Continued)

OTHER PUBLICATIONS

Brownlee, J. (2020) How to Calculate Correlation Between Variables in Python—MachineLearningMastery.com.

*Primary Examiner* — Kenny H Truong
(74) *Attorney, Agent, or Firm* — The Roy Gross Law Firm, LLC; Roy Gross

(57) ABSTRACT

An acoustic signal cancellation system is configured to perform: (a) provide a user device, associated with the system, and an audio capture device. (b) receive at system a captured signal indicative of a captured acoustic signal. It's received at capture device, and comprises a second acoustic signal generated by a second device, external to user device. (c) receive, from external source, a reference signal, indicative of a content included in the second signal. (d) in a case that a content of reference signal and the content in second signal are not time-synchronized, generate a synchronized reference signal, based on reference signal. Content of synchronized reference signal and second signal content are time-synchronized. (e) perform acoustic signal cancelling of that portion of captured signal which corresponds to second signal, based on reference signal. Generate reduced signal. This facilitates output of reduced signal to third device.

19 Claims, 11 Drawing Sheets

(56) References Cited

U.S. PATENT DOCUMENTS

| | | |
|---|---|---|
| 2017/0093943 A1 | 3/2017 | Alsina et al. |
| 2017/0238058 A1 | 8/2017 | Wong et al. |
| 2018/0130482 A1 | 5/2018 | Michel et al. |
| 2018/0255332 A1 | 9/2018 | Heusser |
| 2018/0295402 A1 | 10/2018 | Francisco et al. |
| 2018/0352286 A1 | 12/2018 | Rennison et al. |
| 2019/0387313 A1 | 12/2019 | Bharitkar et al. |
| 2020/0314479 A1 | 10/2020 | Umansky et al. |
| 2021/0235149 A1 | 7/2021 | Madison et al. |
| 2021/0329317 A1 | 10/2021 | Dodson et al. |
| 2021/0352359 A1 | 11/2021 | Barvo et al. |

FOREIGN PATENT DOCUMENTS

| | | |
|---|---|---|
| GB | 2575873 A | 1/2020 |
| KR | 20220017775 A | 2/2022 |
| WO | WO-2022030857 A1 * | 2/2022 |
| WO | 2022030857 A1 | 10/2022 |

* cited by examiner

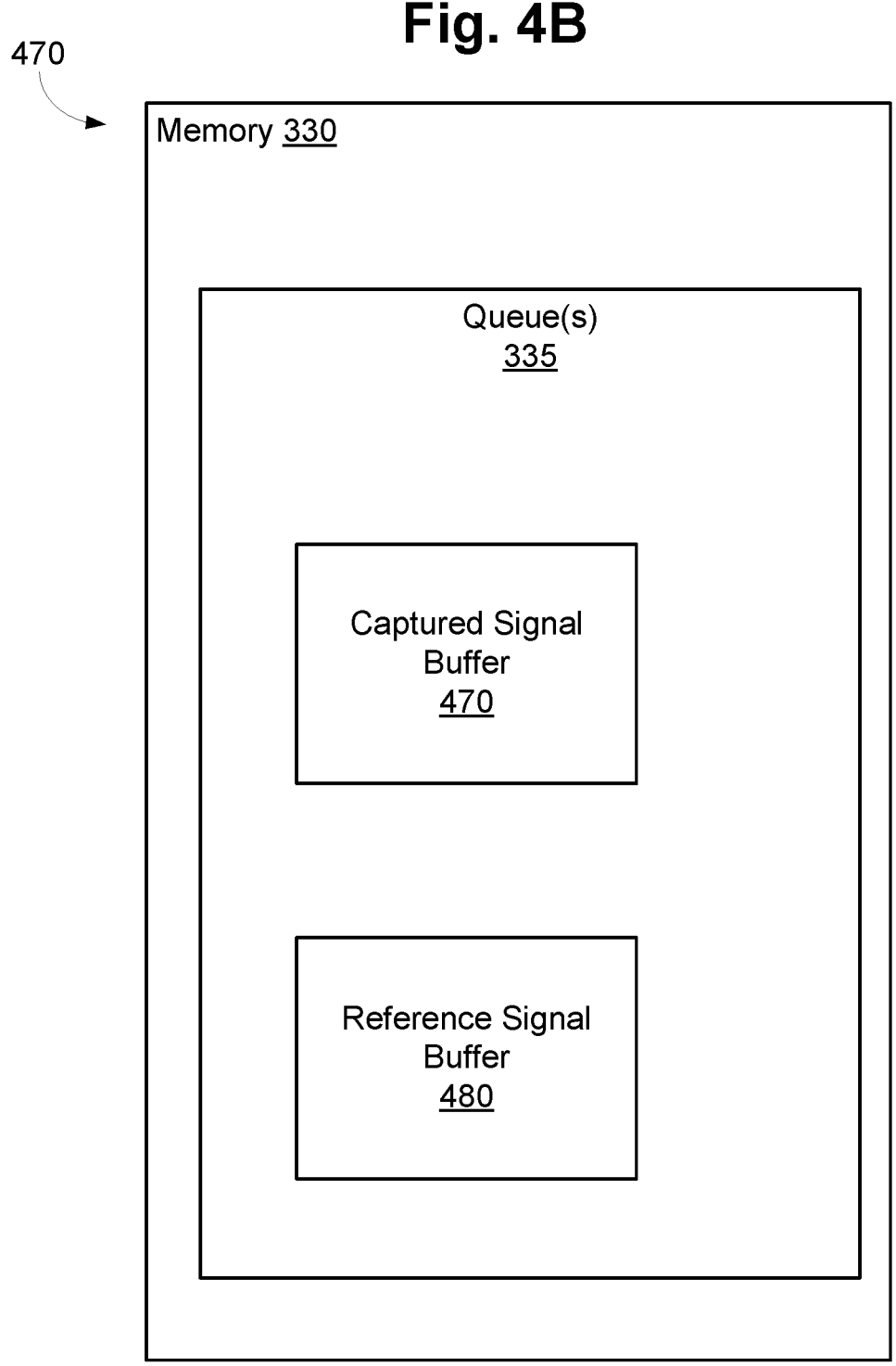

ACOUSTIC SIGNAL CANCELLING

CROSS REFERENCE TO RELATED APPLICATIONS

This application is a continuation-in-part of U.S. patent application Ser. No. 17/687,914, filed on Mar. 7, 2022. The content of this application is incorporated by reference in its entirety.

TECHNICAL FIELD

The presently disclosed subject matter relates to reduction of acoustic signals with user devices.

BACKGROUND

Acoustic Echo Cancelling is performed in user devices, to prevent echo to a speaker in a remote device from hearing his or her own voice captured in the user device microphone. Noise reduction mechanism suppress, within a user device, stationary background noise in e.g. a room.

GENERAL DESCRIPTION

According to a first aspect of the presently disclosed subject matter there is presented a computerized acoustic signal cancellation system, comprising a processing circuitry, configured to perform a method comprising the following actions:
  a. provide a user device, associated with the acoustic signal cancellation system, and an audio capture device associated with the user device and operatively coupled to the acoustic signal cancellation system;
  b. receive at the acoustic signal cancellation system a captured signal indicative of a captured acoustic signal, wherein the captured acoustic signal is received at the audio capture device,
    wherein the captured acoustic signal comprises a second acoustic signal which is generated by a second device, the second device being external to the user device;
  c. receive, at the acoustic signal cancellation system, from an external source, a reference signal,
  the reference signal being indicative of a content that is included in the second acoustic signal;
  d. in a case that a content of the reference signal and the content that is included in second acoustic signal are not time-synchronized,
    generate a synchronized reference signal, based on the reference signal, such that a content of the synchronized reference signal and the content that is included in second acoustic signal are time-synchronized;
  e. in a case that a content of the reference signal and the content that is included in second acoustic signal are time-synchronized,
    set the reference signal to constitute a synchronized reference signal; and
  f. perform acoustic signal cancelling of that portion of the captured signal which corresponds to the second acoustic signal, based on the synchronized reference signal, thereby generating a reduced captured signal,
  thereby facilitating output of the reduced captured signal to a third device.
In addition to the above features, the method according to this aspect of the presently disclosed subject matter can include one or more of features (i) to (xxxvii) listed below, in any desired combination or permutation which is technically possible:
  (i) the method further comprising:
    g. outputting the reduced captured signal to the third device, the third device being operatively coupled to the user device.
  (ii) the captured acoustic signal and the reference signal are associated with a same broadcast of audio content.
  (iii) the second device is configured to play audio-visual media, and the second device comprises a loudspeaker acoustic output.
  (iv) the external source is the second device.
  (v) the acoustic signal cancellation system is comprised in the user device.
  (vi) the acoustic-input device is a microphone.
  (vii) the user device is one of a mobile phone, a tablet and a personal computer.
  (viii) the second device is a television set.
  (ix) the acoustic signal cancelling is performed using an acoustic signal cancelling filter.
  (x) the synchronized reference signal and the reference signal are the same.
  (xi) the generation of the synchronized reference signal comprises performing synchronization of the captured signal with the reference signal, the synchronized reference signal having a defined level of delay relative to the captured signal.
  (xii) the method further comprising performing the following step:
    h. receiving one or more items of synchronization information associating the second acoustic signal with the reference signal,
    wherein the performing of the synchronization is based at least on the one or more items of synchronization information.
  (xiii) the user device and the second device are synchronized to a common content time position,
    the common content time position being associated with a shared consumption of the content by the user device and the second device,
  wherein the second acoustic signal is associated with the common content,
  wherein the generation of the synchronized reference signal is based on maintaining a time position of the synchronized reference signal, within the defined level of delay, wherein the time position of the synchronized reference signal is ahead of a second time position of the captured signal,
  wherein the synchronization comprises tuning at least one signal buffer.
  (xiv) the synchronization comprises performing the following steps:
  i. predicting an audio delay associated with the captured signal, the predicted audio delay being indicative of a time of availability of the captured signal for the acoustic signal cancelling; and
  ii. calculating a modified common content position,
    wherein the calculation of the modified common content position is based at least on the common content time position, on the maintaining of the time position of the reference signal and on the predicted audio delay,
  wherein the synchronization of the portion of the captured signal with the reference signal is based on the modified common content position.

(xv) the calculation of the modified common content position is based at least on one or more of: a distance in time of the second device from the common content position; a threshold distance associated with the shared consumption of the content.

(xvi) the synchronization further comprises performing the following step:

iii. monitoring an actual audio delay between an availability time of the captured signal and a distance of the synchronized reference signal from the modified common time position.

(xvii) the synchronization further comprises performing the following step:

iv. in response to determining that the time position of the reference signal is behind the second time position of the captured signal, performing again said steps (i) and (ii), based on the actual audio delay.

(xviii) the content is an audio-visual content.

(xix) the second device is connected to the Internet.

(xx) the external source is a content delivery network (CDN) system.

(xxi) the acoustic-input device is comprised in the user device.

(xxii) the acoustic signal cancellation system utilizes a Software Development Kit (SDK).

(xxiii) user device is a mobile device.

(xxiv) the third device is one of a mobile phone, a tablet and a personal computer.

(xxv) the acoustic signal cancelling filter is comprised in an Audio-Video Communication (AVC) module of the user device.

(xxvi) the synchronization utilizes at least one signal buffer.

(xxvii) the received one or more items of synchronization information comprise at least one of: the common content position; a distance in time of the second device from the common content position.

(xxviii) the received one or more items of synchronization information are received directly from the second device.

(xxix) the received one or more items of synchronization information are received from the second device via a fourth device.

(xxx) the at least one signal buffer comprises a reference signal buffer, wherein the synchronization comprises adjusting a head of the reference signal buffer at least based on the modified common content position.

(xxxi) the calculation of the modified common content position is based at least on a threshold distance associated with the shared consumption of the content.

(xxxii) the synchronization further comprises performing the following steps:

v. decoding an audio stream associated with the reference signal; and vi. pushing the audio stream to the reference signal buffer.

(xxxiii) the step (iii) comprises decrypting the audio stream.

(xxxiv) the monitoring of the actual audio delay comprises performing a correlation of the synchronized reference signal with the captured signal.

(xxxv) the synchronization further comprises performing the following step:

vii. tuning the modified common content position and the head of the reference signal buffer, thereby facilitating a maintenance of the defined level of delay (xxxvi) the steps vii to viii are performed continuously.

(xxxvii) the third device is synchronized to the common content time position.

According to a second aspect of the presently disclosed subject matter there is presented a computerized acoustic signal cancellation method, capable of being performed by a computerized acoustic signal cancellation system comprising a processing circuitry, the method comprising performing the following actions:

a. provide a user device, associated with the acoustic signal cancellation system, and an audio capture device associated with the user device and operatively coupled to the acoustic signal cancellation system;

b. receive at the acoustic signal cancellation system a captured signal indicative of a captured acoustic signal, wherein the captured acoustic signal is received at the audio capture device, wherein the captured acoustic signal comprises a second acoustic signal which is generated by a second device, the second device being external to the user device;

c. receive, at the acoustic signal cancellation system, from an external source, a reference signal, the reference signal being indicative of a content that is included in the second acoustic signal;

d. in a case that a content of the reference signal and the content that is included in second acoustic signal are not time-synchronized, generate a synchronized reference signal, based on the reference signal, such that a content of the synchronized reference signal and the content that is included in second acoustic signal are time-synchronized;

e. in a case that a content of the reference signal and the content that is included in second acoustic signal are time-synchronized, set the reference signal to constitute a synchronized reference signal; and f. perform acoustic signal cancelling of that portion of the captured signal which corresponds to the second acoustic signal, based on the synchronized reference signal, thereby generating a reduced captured signal, thereby facilitating output of the reduced captured signal to a third device.

According to a third aspect of the presently disclosed subject matter there is presented a non-transitory computer readable storage medium tangibly embodying a program of instructions that, when executed by a computerized acoustic signal cancellation system, cause the computer to perform a computerized method, the method being performed by a processing circuitry of the computerized acoustic signal cancellation system and comprising performing the following actions:

a. provide a user device, associated with the acoustic signal cancellation system, and an audio capture device associated with the user device and operatively coupled to the acoustic signal cancellation system;

b. receive at the acoustic signal cancellation system a captured signal indicative of a captured acoustic signal, wherein the captured acoustic signal is received at the audio capture device, wherein the captured acoustic signal comprises a second acoustic signal which is generated by a second device, the second device being external to the user device;

c. receive, at the acoustic signal cancellation system, from an external source, a reference signal, the reference signal being indicative of a content that is included in the second acoustic signal;

d. in a case that a content of the reference signal and the content that is included in second acoustic signal are not time-synchronized, generate a synchronized reference signal, based on the reference signal, such that a content of the synchronized reference signal and the content that is included in second acoustic signal are time-synchronized;

e. in a case that a content of the reference signal and the content that is included in second acoustic signal are time-synchronized, set the reference signal to constitute a synchronized reference signal; and f. perform acoustic signal cancelling of that portion of the captured signal which corresponds to the second acoustic signal, based on the synchronized reference signal, thereby generating a reduced captured signal, thereby facilitating output of the reduced captured signal to a third device.

The computerized systems and the non-transitory computer readable storage media, disclosed herein according to various aspects, can optionally further comprise one or more of features (i) to (xxxvii) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 4B illustrates schematically an example generalized schematic diagram of queues, in accordance with some embodiments of the presently disclosed subject matter;

DETAILED DESCRIPTION

Figure 1:
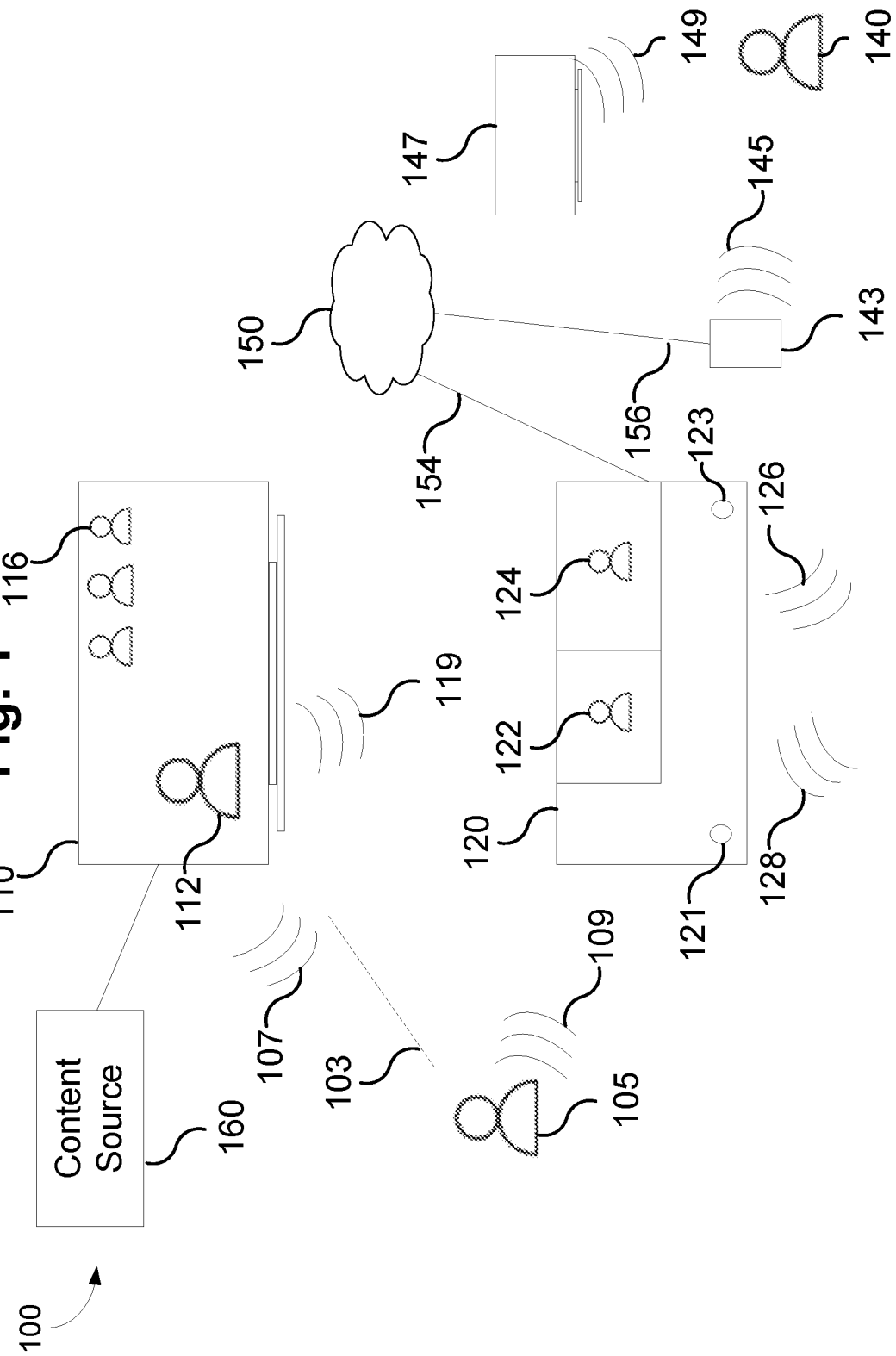
FIG. 1 illustrates schematically an example generalized view of content consumption, in accordance with some embodiments of the presently disclosed subject matter.

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

Unless specifically stated otherwise, as apparent from the following discussions, it is appreciated that throughout the specification discussions utilizing terms such as "providing", "presenting", "receiving", "performing", "checking", "recording", "detecting", "generating", "setting" or the like, refer to the action(s) and/or process(es) of a computer that manipulate and/or transform data into other data, said data represented as physical, e.g. such as electronic or mechanical quantities, and/or said data representing the physical objects. The term "computer" should be expansively construed to cover any kind of hardware-based electronic device with data processing capabilities including a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), and any other electronic computing device, including, by way of non-limiting example, computerized systems or devices 120 and processing circuitry 315 disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "one example", "some examples", "other examples", or variants thereof, means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof, should be construed as conveying that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that the teachings of the presently disclosed subject matter are not bound by what is described with reference to any of the figures or described in other documents referenced in this application.

Bearing this in mind, attention is drawn to FIG. 1, schematically illustrating an example generalized view of content consumption, in accordance with some embodiments of the presently disclosed subject matter. Example scenario 100 depicts a an individual 105, e.g. Bob, consuming a content, e.g. watching 103 a television (TV) broadcast or other program, in a shared manner with other individuals, e.g. Bob's friends.

In the example, Bob is watching his television set 110, which exemplifies a second device 110. In some examples, the TV set is connected to the Internet. The TV device receives the content from a content source 160. One non-limiting example of a content source is a content delivery network (CDN) 160.

In another non-limiting example, the second device 110 plays local audio that is available.

Thus, the second device is configured to output audio-visual or audio media, e.g. digital media. The second device has a loudspeaker to convert electrical energy into and acoustical signal that is radiated into the open air of the room/space in which Bob is located.

The second device 110 is in the same room as Bob, and he hears 107 the sound of the broadcast, movie or other content. In the example of the figure, presented for illustrative purposes only, the TV show is a sports event, and the acoustic output of device 110 includes the voices of an announcer 112 and of the audience 116 and/or players 116.

The television is one non-limiting example of a second device 110. In other non-limiting examples, the second device is a computer, playing audio-visual content (e.g. video streaming) or audio content (e.g. a music streaming service, a podcast or internet radio).

Individual 105 also is holding or otherwise using a user device 120, e.g. a personal computer 120. In some examples, user device 120 is a mobile device, e.g. a smartphone, other mobile phone, other phone, tablet or laptop computer. In the example, the user 105 is consuming the content in a shared manner with his or her friends, e.g. Carla 140 and Albert. In some examples, the group of friends are watching the same TV show or other content, and they are communicating with each other during the watching. For example, an application running on each of their user devices 120, 143 is configured to enable them to talk with each other, doing text chats with each other etc. This shared consumption is referred to herein, in some examples, also as a joint watching, a watching party, a joint watching session, or more generally a joint content consumption session.

In some examples, the joint consumption is of a content obtained by each user from a common content source 160.

In some examples, the joint consumption application also enables them to see each other, e.g. utilizing the user device cameras, as exemplified by the appearance 122, 124 of Albert and Carla on the display of mobile phone 120. Note that Carla's 140 image 124 appears on user device 120.

Carla 140, for example, is watching the same TV show, in her room far away from Bob's home, on e.g. her TV set 147. She hears the acoustic audio output 149 of the TV set. Carla has her own user device 143, e.g. a tablet or mobile phone, through which she interacts with Bob and Albert. Carla's device 143 is referred to herein also as a third device, to distinguish it from first user device 120. In some examples, third device 143 is a mobile phone, a tablet or a personal computer. Third device 143 is operatively coupled 154, 156 to, and in communication with, user device 120, e.g. over a communication network 150. Non-limiting examples of a communication network include a cellular telephone network 150 or the Internet 150.

Note that Albert and his devices are not shown in the figure, for reasons of ease of exposition.

Bob speaks 109 with his friends, his voice being captured 128 by an audio-capture device 121, which is comprised in, attached to, or otherwise associated with, user device 120. The audio-capture device is referred to herein also as acoustic-input device 121. A non-limiting example of acoustic-input device 121 is a microphone. Other sounds and noises in Bob's room (fan rotating, other family members speaking within the same physical space etc.) are also captured by device 121. Carla hears these sounds from Bob's room, as well as sounds from Albert's room (not shown), as an acoustic signal or output 145 from her third user device 143. Similarly, Bob hears acoustic output 126 from the audio-output device 123, e.g. a speaker, comprised in, attached to, or otherwise associated with, user device 120. The acoustic output 126 includes voices and other sounds and noises from Albert's and Carla's rooms.

In some non-limiting examples, the watching party or other shared consumption involves synchronized consumption of the shared content. For example, it may involve a synchronization of the delivery and/or display/presentation of the TV show among all of the group members, to within a defined tolerance that enables them to follow together the shared consumption. That is, for example, Albert, Bob and Carla will, ideally, all see and hear, at approximately the same time, the announcer 112 shout "Goal!", so that they can react to each other, at the same time, to the same viewed/consumed portion of the movie/broadcast/other content. In some such examples, the various user devices 120, 143 of the participants, and their respective TV sets or other second devices 110, 147, are therefore all synchronized to a common or shared content time position.

In some examples, this shared, synchronized, consumption of a shared content by a group of users 105, 122, 124, 140 is referred to herein as a virtual "room", or as a shared content virtual room, distinguished from e.g. the physical room or other space (not shown) in which the user 105, their first user device 120 and their second device 110 and are located. More example disclosure concerning shared content consumption, and synchronization of consumption across multiple devices, e.g. within a virtual room, can be found in the U.S. application Ser. No. 17/687,917, "Method of Facilitating a Synchronized Play of Content and System Thereof", the contents of which are incorporated herein by reference.

The combination of voices, sounds and noises 128 received at the audio capture device 121 is referred to herein also as captured acoustic signal 128. Signal 128 is also referred to herein as first captured acoustic signal 128, to distinguish it from other acoustic signals disclosed herein.

In some examples, a problem arises which can affect user experiences in the joint watching. The sounds of the TV or other second device 110 are referred to herein also as a second acoustic signal 119, or second audio signal, which arrive at the user device 120 and are captured by the microphone 121. Therefore, the captured acoustic signal 128 includes within it the second acoustic signal 119. Therefore, second acoustic signal 119 is part of the electrical audio signal that is transmitted 154, 156 to third user devices 143 such as Carla's.

Recall that Carla is in a joint or consumption session, and thus is watching the same shared TV show as the others in her party, in some cases in a synchronized manner. Carla will therefore hear the audio of the TV show or other content at least twice, as part of the sound 145 being sent by her third user device 143, and also as part of the acoustic signal/output of her own instance 147 of a second content device. This can in some cases result in Carla hearing an annoying echo or repetition of the TV sound, interfering with her enjoyment of the content consumption.

Note also, that if both Bob 105 and Albert 122 are watching/listening to the same content, in some examples Carla will hear the sound 119 of this content coming twice out of 145 her third user device 143, thus exacerbating the poor user experience.

In some examples, it is therefore desirable and advantageous that the acoustic signal 145 coming from the third user device 143 do not contain, to any significant degree, the second acoustic signal 119 received at the first user device 120. The presently disclosed subject matter can in some cases provide at least this technical advantage.

Note that the acoustic signal 145 is referred to herein also as a third acoustic signal 145, to distinguish it from other acoustic signals disclosed herein.

Figure 3:
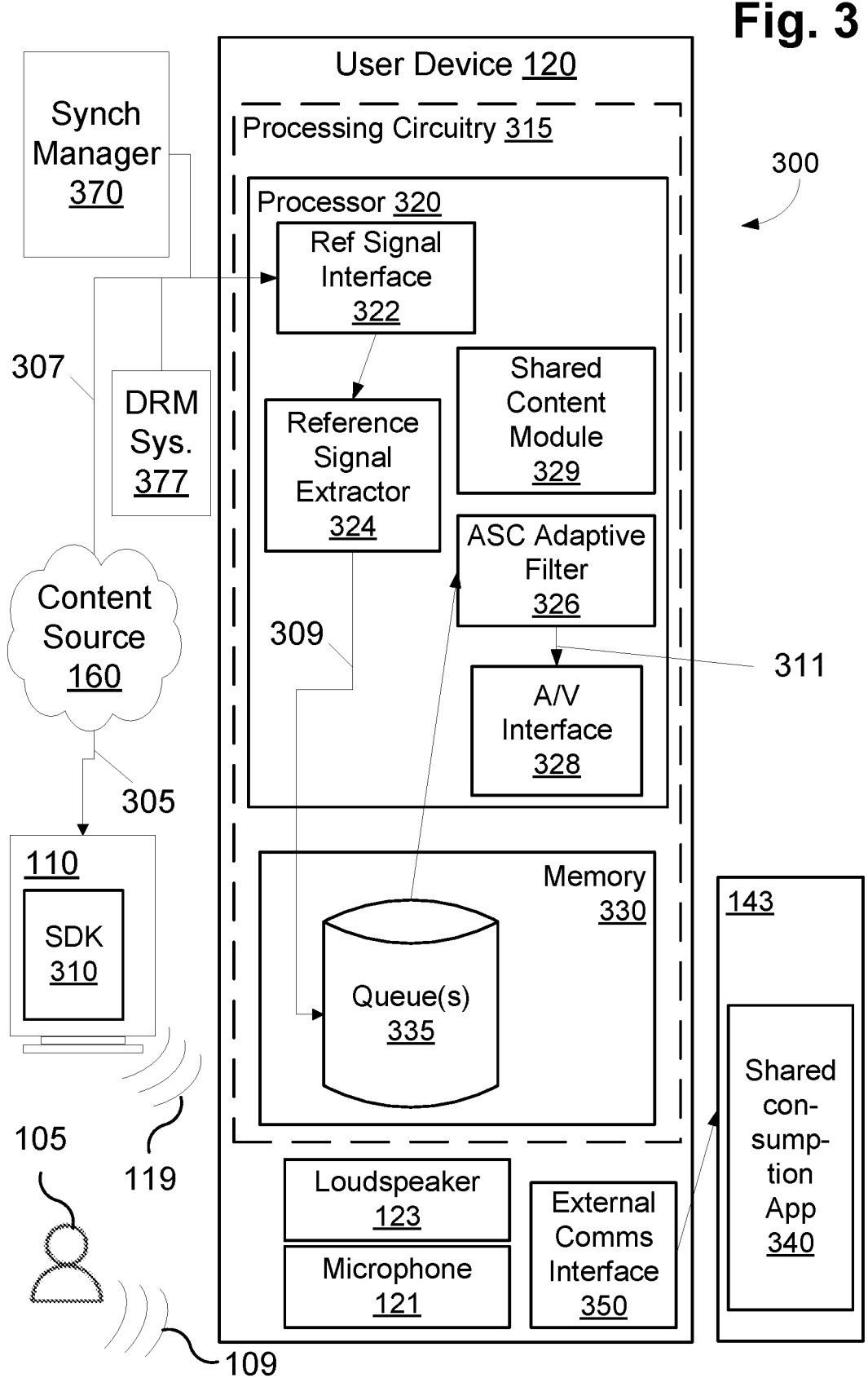
FIG. 3 illustrates schematically an example generalized schematic diagram comprising a user device, in accordance with some embodiments of the presently disclosed subject matter.
Figure 4A:
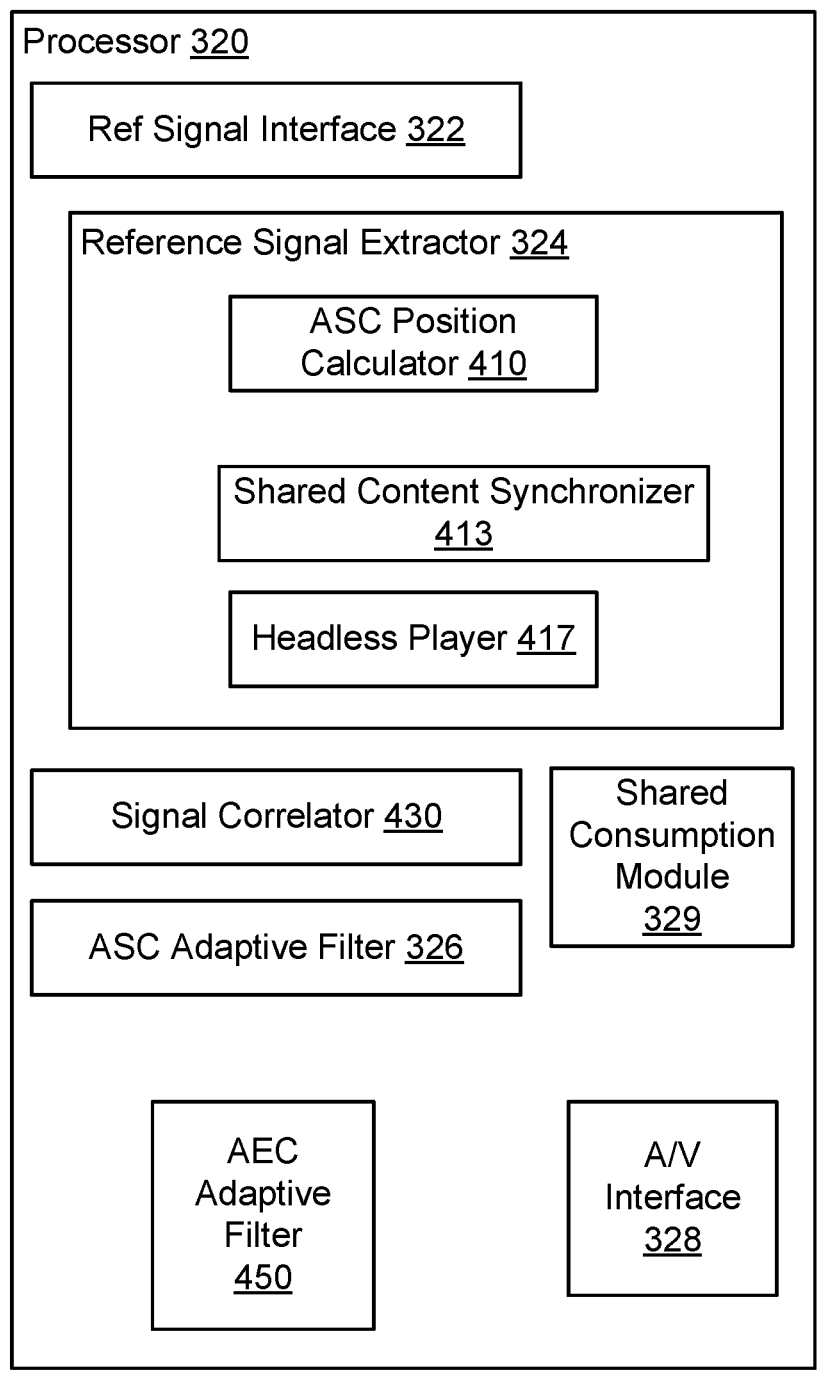
FIG. 4A illustrates schematically an example generalized schematic diagram of a processor, in accordance with some embodiments of the presently disclosed subject matter.
Figure 5:
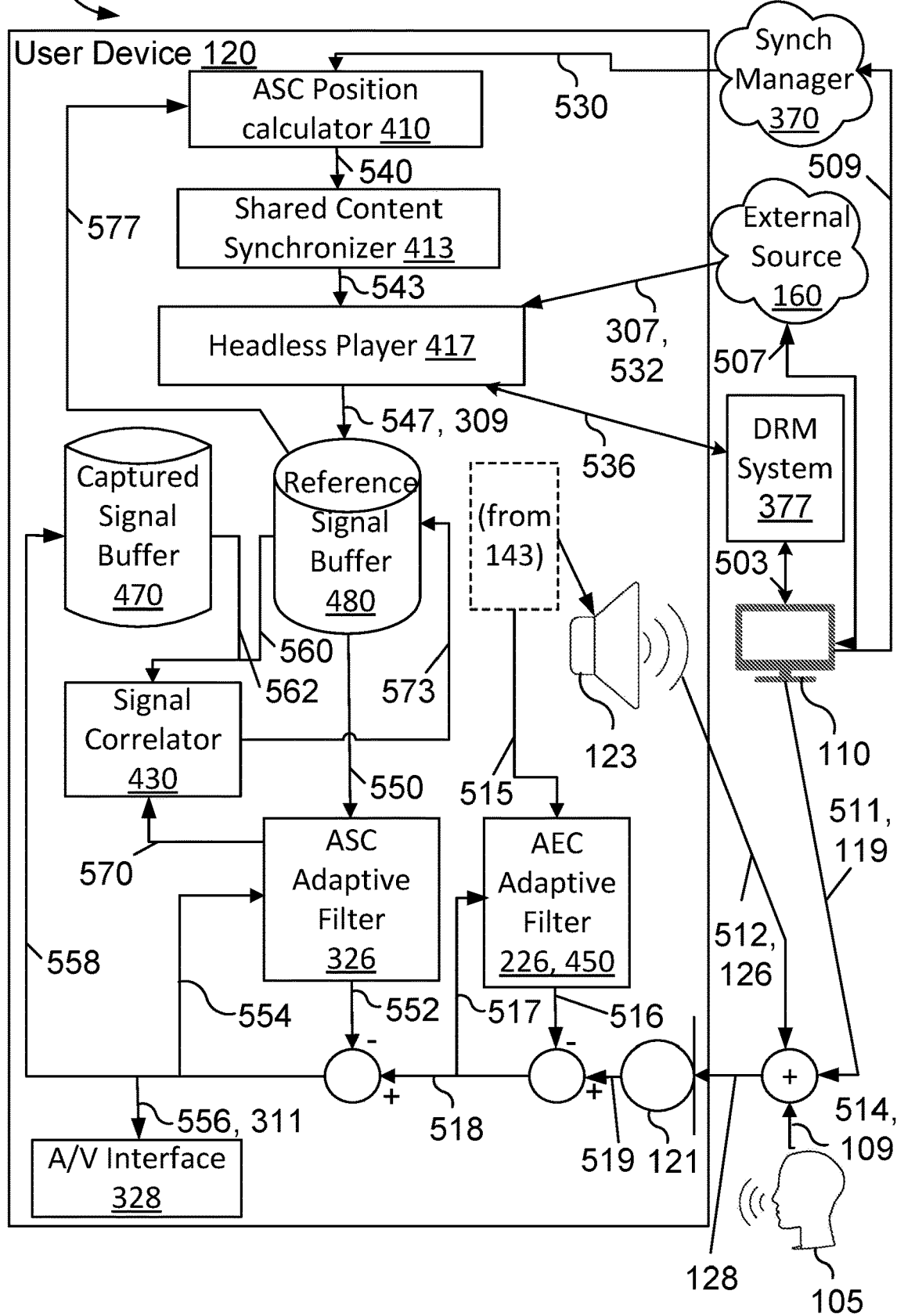
FIG. 5 illustrates schematically an example generalized schematic diagram of acoustic signal cancellation, in accordance with some embodiments of the presently disclosed subject matter.

A computerized acoustic signal cancellation system is disclosed herein, with reference to FIGS. 3-5, which comprises a processing circuitry. A computerized method is disclosed herein, with reference to FIGS. 5 to 8C, which comprises performing the following actions by the processing circuitry:

i. provide the user device 120, associated with the acoustic signal cancellation system;

j. provide the audio capture device 121 associated with the user device, and operatively coupled to the acoustic signal cancellation system;

k. receive at the acoustic signal cancellation system a captured signal 518, 519 indicative of a captured acoustic signal 128, where the captured acoustic signal is received at the audio capture device, where the captured acoustic signal comprises the second acoustic signal 119 which is generated by the second device 110;

l. receive, at the acoustic signal cancellation system, from an external source, a reference signal 307, which is indicative of a content that is included in the second acoustic signal 119;

m. in a case that a content of the reference signal and the content that is included in second acoustic signal are not time-synchronized, generate a synchronized reference signal 309, based on the reference signal, such that a content of the synchronized reference signal and the content that is included in second acoustic signal are time-synchronized;

n. in a case that a content of the reference signal and the content that is included in second acoustic signal 119 are time-synchronized, set the reference signal to constitute a synchronized reference signal; and o. perform acoustic signal cancelling of that portion of the captured signal which corresponds to the second acoustic signal 119, based on the synchronized reference signal, thereby generating a reduced captured signal.

This method can in some examples facilitate output 154 of the reduced captured signal to third device 143.

Note that the second device 110 is external to, and distinct from, the user device 120.

In some examples, the generation of the synchronized reference signal comprises performing synchronization of the captured signal with of the reference signal, such that the synchronized reference signal has a defined level of delay relative to the captured signal.

In some examples, the method further includes:

p. receiving one or more items of synchronization information associating the second acoustic signal with the electrical reference signal. The performing of the synchronization is then based at least on the item(s) of synchronization information.

In some examples, the user device 120 and the second device 110 are synchronized to a common content time position, which is associated with the shared consumption of the content by the user device and the second device. The second acoustic signal 119 is associated with the common content, e.g. the TV show being broadcast.

In some such examples, the item(s) of synchronization information includes one or more of the common content position and a distance in time of the second device 110 from the common content position.

In some such examples, the generation of the synchronized reference signal is based on maintaining a time position of the reference signal, within the defined level of delay. In some examples, as will be disclosed further herein, it is advantageous that the time position of the reference signal be ahead of a second time position of the captured signal.

In some examples, the synchronization includes performing at least the following steps:

viii. predicting an audio delay associated with the captured signal. The predicted audio delay is indicative of a time of availability of the captured signal for the acoustic signal cancelling; and ix. calculating a modified common content position.

In some examples, the calculation of the modified common content position is based at least on the common content time position, on the maintaining of the time position of the reference signal and on the predicted audio delay. In such a case, the synchronization of the captured signal with the reference signal is based on the modified common content position.

In some examples, the calculation of the modified common content position is based at least on the distance in time of the second device 110 from the common content position.

In some examples, the synchronization utilizes a signal buffer, e.g. a reference signal buffer 480. The synchronization comprises adjusting a head of the reference signal buffer, at least based on the modified common content position.

In some examples, the calculation of the modified common content position is based at least on a threshold distance associated with the shared consumption of the content.

More details of exemplary acoustic signal cancellation systems are disclosed with reference to FIGS. 3-5.

More details of exemplary synchronization methods and systems, disclosing at least the above possible features, are disclosed with reference to FIGS. 4B-6 and 8A-8C.

Figure 2:
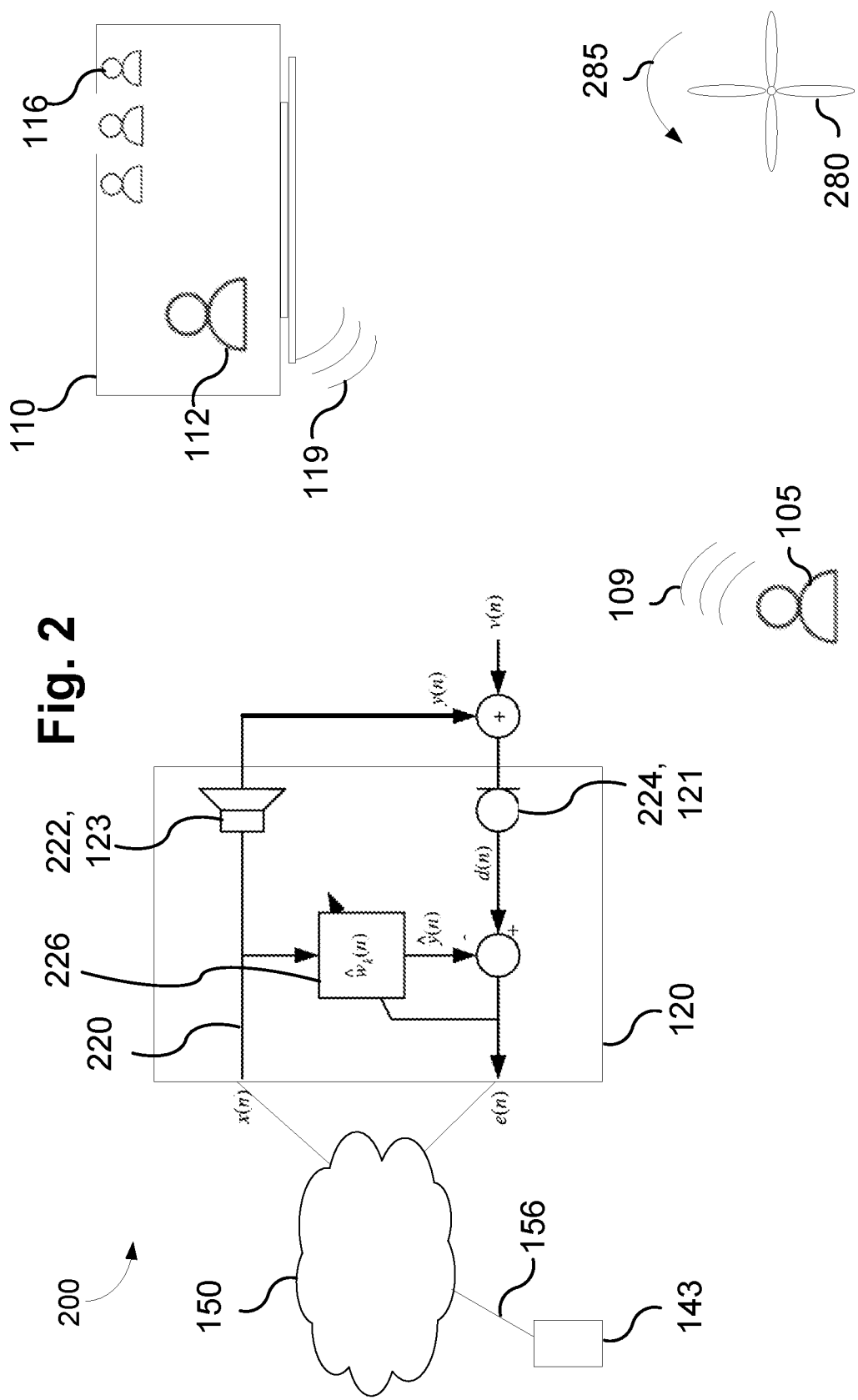
FIG. 2 illustrates schematically an example generalized view of a prior art solution, in accordance with some embodiments of the presently disclosed subject matter.

Attention is now drawn to FIG. 2, schematically illustrating an example generalized view of a prior art solution 200, in accordance with some embodiments of the presently disclosed subject matter. The figure illustrates a generalized architecture of echo cancellation and noise reduction.

In some prior art systems, user device 120 comprises a circuitry 220 for acoustic echo canceling (AEC). Commonly, AEC mechanisms are implemented using adaptive filters 226. These filters are probably specifically designed to model the echo behavior of so-called loudspeaker-enclosure-microphone (LEM) systems. In an LEM system the loudspeaker 222 and the microphone 224 are connected by an acoustical path formed by a direct connection (if both can "see" each other) and in general a large number of reflections at the boundaries of the enclosure. A smartphone 120, for example, is a LEM system because loudspeaker 222 and microphone 224 are integrated in the same enclosure.

In the figure, the voice of Carla is sent 156 as an electrical signal, from her third device 143, e.g. over a network 150, and arrives at Bob's user device 120. The far-end electrical signal which includes Carla's voice is denoted by function x(n). It is sent by loudspeaker 222, or other audio output device, as an acoustic signal, denoted as function y(n). In some examples, device 222 is the device 123 of FIG. 1.

Carla's voice y(n), exiting the loudspeaker to the room, is captured again, as echo, by the microphone or other audio capture device 224. In some examples, device 224 is the device 121 of FIG. 1. Also captured by device 224 are other sounds v(n) ambient in the room or other space in which user device 120 is located—e.g. Bob's 105 voice 109, voices of other people in the room (not shown), and additional sounds and noises, such as that of rotating fan 280 and the second acoustic signal 119 that is output by the second device 110. These acoustic signals are combined by microphone 224, and they are converted to the microphone electrical signal, denoted by function d(n). Since d(n) includes Carla's voice y(n), which exited the loudspeaker 222, there is potential that the exiting audio signal e(n) which exits user device 120 towards third user device 143 will include Carla's voice. Therefore, Carla, listening to her device 143, will hear her own voice as an echo, causing an undesirable user experience.

The figure shows the addition to user device 120 of acoustic echo canceling (AEC) filter 226, referred to in some examples as adaptive filter 226. The adaptive filter 226 receives a copy of the same signal x(n) which includes Carla's voice. In some examples it runs a software algorithm, or otherwise provides, a function $\hat{w}_k(n)$ which predicts the far-end signal. The predicted far-end signal is indicated in the figure as $\hat{y}(n)$. The component of signal d(n), which corresponds to the echo y(n) of Carla's voice, is cancelled, that is it is subtracted from the predicted far end signal. Thus Carla hears only a considerably reduced amount of her voice in signal e(n). The error signal is fed back to the filter to maintain the prediction.

In some examples, the adaptive filter 226 is implemented as hardware.

Note that the AEC filter shown in FIG. 2 is capable of cancelling the echo due to a voice or sound coming into user device 120 from an outside electrical signal such as that arriving over communication network 150. Such signal x(n) has the opportunity, in circuit 220, to be sent to filter 226 in parallel to being sent to loudspeaker 222, 123 and being picked up by microphone 224, 121. However, a signal 119, which is an acoustic signal arriving as sound waves within Bob's room, does not arrive via a path such as 156, 150, x(n) which will enable it to reach adaptive filter 226 before, or at the same time that, it reaches microphone 224. Therefore, adaptive filter 226 cannot cancel or reduce the second acoustic signal 119, and thus cannot solve the user experience problem disclosed with reference to FIG. 1.

Another functionality present in some prior art implementations is a noise reduction mechanism (not shown in the figure). Such a mechanism can distinguish between the speech of speakers talking into microphone 224, 121, and noise and other such sounds that can decrease the intelligibility of the captured speech. For example, such a mechanism can suppress, or reduce, ambient noise, i.e. stationary background noise in the room, such as that of the rotation 285 of fan 280. Similarly, a noise reduction mechanism can cancel or reduce background speech such as the unclear, distant, or relatively low-volume speech of e.g. crowd or players 116, broadcast by TV 110. The mechanism does audio levelling, e.g. lowering the volume of the TV broadcast within the captured signal.

However, in the scenario of FIG. 1, such a mechanism cannot distinguish between the speech 109 of Bob, sitting in the room and speaking towards the microphone 224, 121, and the speech 119 of the announcer 112 on the TV 110. To the noise reduction mechanism, both speeches are of similar volume and intelligibility. That is the announcer's speech has characteristics similar to people talking in the room. Therefore, it appears to the noise reduction mechanism that two people are in the room speaking—Bob and the announcer 112. Therefore, the mechanism will not filter out, remove/cancel or suppress that second acoustic signal 119 associated with announcer 112, unless the mechanism also filters out Bob's voice 109. Thus, a noise reduction mechanism will not serve to solve the problem disclosed with reference to FIG. 1.

FIGS. 3-5 disclose example systems for acoustic signal filtering, per the presently disclosed subject matter.

Attention is now drawn to FIG. 3, schematically illustrating an example generalized schematic diagram 300 comprising a user device 120, in accordance with some embodiments of the presently disclosed subject matter. In some non-limiting examples, computerized user device 120 includes a computer. It may, by way of non-limiting example, comprise a processing circuitry 315. This processing circuitry may comprise a processor 320 and a memory 330.

This processing circuitry 315 may be, in non-limiting examples, general-purpose computer(s) specially configured for the desired purpose by a computer program stored in a non-transitory computer-readable storage medium. They may be configured to execute several functional modules in accordance with computer-readable instructions. In other non-limiting examples, this processing circuitry 315 may be a computer(s) specially constructed for the desired purposes. In some examples, user device 120 is a personal computer 120. In some examples, user device 120 is a mobile device, e.g. a smartphone, other mobile phone, other phone.

As indicated earlier, in some examples user device 120 comprises microphone or other audio capture device 121. Audio capture device 121 is configured to capture acoustic signals (sounds) emitted 109, 119 from e.g. human user 105 and the TV set or other second device 110. In some other examples, the acoustic-input device is external to the user device 120. For example, it may be a microphone that is attached, plugged into, or otherwise operatively connected or coupled, to the user device 120.

Note that the second device 110 is external to the user device 120.

As indicated earlier, in some examples user device 120 comprises loudspeaker, earphone/headphone jack/interface or other audio output device 123. Output device 123 plays acoustic signals that user 105 can hear, e.g. the speech of Bob's friends Albert 122 and Carla 124.

In some examples, user device 120 comprises an external communications interface 350, e.g. a cellular/telephone and/or internet interface, enabling communications with other devices. An example of another device is Carla's third device 143, shown. It was disclosed, in FIG. 1, that in some cases the communication 154, 156 is via network 150.

In some examples, external communications interface 350, or in some examples some other interface module, is configured to communicate directly with second device 110 located in the vicinity of Bob 105, e.g. using a wireless or wired interface. Example functions of such a communication interface are disclosed further herein.

In some examples, the second device 110 is configured to play audio-visual media, and the second device comprises a loudspeaker 123 acoustic output. In some examples, the second device is connected to the Internet.

Turning now to processor 320 of processing circuitry 315, in some examples it comprises shared content module 329. In some examples, module 329 is referred to herein also as shared consumption module 329. In some examples, shared content module comprises an app facilitating joint consumption of a content. For example, the app has user interface screens such as "choose a TV show to watch", "invite friends to watch with me", "chat/message with my friends during the viewing" etc. In some examples, shared content module 329 comprises a component, e.g. a software development kit (SDK), which synchronizes the shared consumption across some or all of the devices involved in the consumption, e.g. user device 120, second device 110, third device 143 and Carla's TV set 147. This synchronization is exemplified in FIG. 2, schematically, by the presence of a shared consumption app or module 340 in Cara's device 143, and an SDK 310 in second device 110.

In some examples, processor 320 comprises reference signal interface module 322. In some examples, interface 322 is configured to receive a reference signal from an external source, that is external to user device 120. This reference signal is indicative of a content that is included in the second acoustic signal 119.

For example, a particular TV show, a particular broadcast of a sports event, or a particular movie, is transmitted 305, e.g. from a content source 160, as an electrical signal (whether digital or analog) to second device 119. An electrical signal 307 (whether digital or analog), comprising at least the audio component of this same TV show, is also sent from content source 160 to the reference signal interface 322. One non-limiting example of a content source is a content delivery network (CDN) 160. The CDN in some examples is providing video from an Over the Top (OTT) source. Content source 160 is a non-limiting example of an external source.

In some examples, the content is an audio-visual content.

In another non-limiting example, the user device and the second device obtain the reference signal from a common content source 160 that is not a CDN. In still another non-limiting example, the reference signal is received from the second device 110 itself.

Electrical signal 307 is referred to herein as electrical reference signal 307, or more simply as reference signal 307. In some examples, reference signal 307 optionally includes also the video component of the content, if there is one. However, the example method disclosed herein utilizes only the audio component of the content.

In some examples, the captured acoustic signal 119 and the reference signal are associated with a same broadcast of audio content. An example of such a broadcast is a broadcast of a game or program, or a podcast. In some examples, these audio programs/programs/contents are delivered over the Internet.

In some other examples, disclosed further herein, and not shown in the figure, reference signal 307 is received by reference signal interface module 322 directly from the second device 110. Second device 110 is another non-limiting example of an external source.

In some examples, the reference signal interface 322 is also configured to interface to a synchronization manager system 370. In some examples, the reference signal 307, and the second acoustic signal 119 captured by microphone 121, are not sufficiently time-synchronized to enable effective cancellation of the second acoustic signal 119. A synchronization process is thus required, which utilizes synchronization manager 370. More details on this function are disclosed with reference to FIG. 5.

In some examples, synchronization manager 370 is referred to herein a session manager, virtual room manager or back end 370.

In some examples, processor 320 comprises reference signal extractor module 324. In some examples, module 324 is also configured to receive the reference signal 307 from reference signal interface 322. In some examples, in a case where the content of the reference signal 307 and the content that is included in second acoustic signal 119 are not time-synchronized, the module 324 is configured to generate a synchronized reference signal 309, based on the reference signal, such that the content of the synchronized reference signal and the content that is included in second acoustic signal 119 are time-synchronized.

In a case that the content of the reference signal 307 and the content that is included in second acoustic signal 119 are time-synchronized, reference signal extractor module 324 is configured to set the reference signal to constitute the synchronized reference signal 309. That is, in such a case the synchronized reference signal 309 and the reference signal 307 are the same. An example of such a case is one in which the reference signal 307 is sent directly, from the second device (TV) to the user device, e.g. using an ultra-low latency channel (not shown in the example of the figure). In some such implementations, the user device 120 need not communicate with TV 110 via the external synchronization manager 370.

In some examples, the reference signal extractor 324 is also configured to interface to Digital Rights Management (DRM) system 377. This may be required where the content in reference signal 307 is encrypted or otherwise protected. More details on this function are disclosed with reference to FIGS. 5 and 8.

Exemplary sub-modules of module 324 are disclosed with reference to FIG. 4A. More details on time synchronization are disclosed with reference to FIGS. 5 and 6.

In some examples, the synchronized reference signal 309 is pushed by module 324 to one or more queues 335, which are comprised in memory 330. More detail on the queues and their functions are disclosed with reference to FIGS. 4B and 5.

In some examples, processor 320 comprises acoustic signal cancellation (ASC) adaptive filter 326. In some examples, the synchronized reference signal 309 is sent to ASC adaptive filter 326 from queue(s) 335. ASC adaptive filter 326 is configured to receive synchronized reference signal 309. In some other examples, the synchronized reference signal 309 is sent to ASC adaptive filter 326 directly from reference signal extractor module 324.

ASC adaptive filter 326 is further configured to receive an electrical captured signal 518, 519 (not shown), which is indicative of captured acoustic signal 128. In some examples, this first captured signal is based on the electrical output of audio capture device 121. This electrical captured signal 518, 519 is also referred to herein as a captured signal, a first captured signal, and a simply as a first signal. In some examples, the filter 326 is configured to perform acoustic signal cancelling of that portion of the captured signal which corresponds to the second acoustic signal 119, based on the synchronized reference signal 309. The filter thereby generates a reduced captured signal 311, referred to herein also as a reduced first signal.

The reduced captured signal, in some examples, comprises a substantially reduced portion of the second acoustic signal 119, such that the corresponding sound is not audible to the user 140 of third device 143. In some examples, the ASC adaptive filter 326 is able to apply an echo return loss enhancement (ERLE), that is an amount of additional signal loss applied by the echo canceller, in the range of 18 to 35 dB ERLE. In some examples, full 100% cancellation is not necessarily expected or required.

In some non-limiting examples, ASC adaptive filter 326 is a software module, running a software algorithm. In some other non-limiting examples, ASC adaptive filter 326 is at least partly hardware based. A hardware-based implementation is in some examples more relevant when using dedicated devices, rather than in the case of a a general-purpose mobile device 120.

Note that first acoustic signal 128, comprising the second acoustic signal 119, which are captured at audio-capture device 224, 121, are acoustic signals, that are they are actual sound waves transmitted e.g. in the room in which Bob 105 is sitting. By contrast, reference signal 307 is an electrical signal, providing an electrical representation of the second acoustic signal 119. This is true also of the synchronized reference signal 309. Similarly, the first captured signal 518, 519, based on the output of microphone 121, comprises an electrical representation of second acoustic signal 119. Signal 307, and the first captured signal, are thus received by processing circuitry 315.

Additional disclosure on filter 326, and on these various acoustic electrical and acoustic signals, is provided further herein with reference to FIG. 5.

In some examples, processor 320 comprises audio-video interface module 328. In some examples, module 328 receives the reduced first signal 311 output by ASC adaptive filter 326. Module 328 interfaces, for example, to an external communications interface 350, to send or output the reduced first signal to external devices such as third device 143. In one example, audio-video interface module 328 utilizes Web Real-Time Communication (WebRTC).

In some examples, e.g. for handling of an audio-only content (e.g. radio broadcast or audio podcast) module 328 is an audio interface module 328.

Note that in some cases, the solution for acoustic signal cancelling is at least partly enabled by the fact that the architecture 300 provides a solution for synchronization of a common content across several devices 110, 120, 143. Since the content synchronization solution, using e.g. Shared Content Module 329, in some examples requires that the user device 120 access the synchronization manager 370 and content source 160, the signals received from those systems can be used by device 120 to obtain the reference signal, to synchronize it if necessary, and to use it to cancel the acoustic signal.

Note that in other examples the synchronization is only between user device 120 and second device/TV 110.

Additional example functional modules of processor 320 are disclosed further herein with reference to FIG. 4A.

In some examples, memory 330 of processing circuitry 315 comprises one or more queues 335. Additional example components of queue 335 are disclosed further herein with reference to FIG. 4B. More detail on the queues and their functions are disclosed also with reference to FIG. 5.

In some examples, memory 330 of processing circuitry 310 is configured to store data associated with at least the receipt and synchronization of reference signals 307, and/or with signal correlation e.g. as disclosed further herein with reference to FIG. 5.

Attention is now drawn to FIG. 4A, schematically illustrating an example generalized schematic diagram 400 of a processor 320, in accordance with some embodiments of the presently disclosed subject matter. In some non-limiting examples, processor 320 includes one or more additional modules, in addition to those disclosed with reference to FIG. 3. Example modules 322, 324, 326, 329, 328 were disclosed with reference to FIG. 3.

In some examples, processor 320 comprises AEC adaptive filter 450. In some examples, module 450 is the AEC adaptive filter 226 of FIG. 2.

In some examples, reference signal extractor module 324 comprises at least several sub-modules. In some non-limiting examples, reference signal extractor module 324 comprises acoustic signal cancellation (ASC) position calculator module 410. In some non-limiting examples, reference signal extractor module 324 comprises shared content synchronizer module 413. In some non-limiting examples, reference signal extractor module 324 comprises headless player module 417. Example functions of modules 410, 413, 417 are disclosed further herein with reference to FIGS. 5 and 8.

In other examples, these modules 410, 413, 417 are separate modules, separate from reference signal extractor module 324. For example, in some implementations, reference signal extractor module 324 is comprised in shared content module 329, disclosed with reference to FIG. 3. Thus, in a case in which synchronization is performed while playing a shared content, the module 329 can be used to synchronize headless player module 417 to the desired position, based on the position of the TV 110 on the shared content.

Note that in the non-limiting example of the figures, the acoustic signal cancelling is performed using an acoustic signal cancelling filter 326. In some examples, the acoustic signal cancelling filter is comprised in an Audio-Video Communication (AVC) module of the user device.

In some examples, processor 320 comprises signal correlation module 430. Example functions of signal correlator 430 are disclosed further herein with reference to FIG. 5.

In some examples, some or all of the modules 322, 324, 430, 326, 335, and in some cases also 329, are collectively referred to as being comprised in an acoustic signal cancellation system. In some examples, this system is referred to herein also as an acoustic signal reduction system, in that the signal output by this system contains the second acoustic signal 119 to a substantially reduced degree than in the input signal, due to the action of ASC adaptive filter 326.

In the example of the figures, the acoustic signal cancellation system is comprised in the user device 120, for example as a software solution.

In some other examples, the acoustic signal cancellation system is not part of user device 120, but rather is, for example, comprised in separate hardware, which is configured to plug in, or otherwise to operatively connect or couple to, user device 120.

In some examples, the acoustic signal cancellation system utilizes a Software Development Kit (SDK).

Attention is now drawn to FIG. 4B, schematically illustrating an example generalized schematic diagram 470 of queues 335, in accordance with some embodiments of the presently disclosed subject matter. In some non-limiting examples, queues 335 are comprised in memory 330.

In some non-limiting examples, queues 335 comprise captured signal buffer 470. In some non-limiting examples, queues 335 comprise reference signal buffer 480. Example functions of buffers 470, 480 are disclosed further herein with reference to FIG. 5.

Attention is now drawn to FIG. 5, schematically illustrating an example generalized schematic diagram 500 of acoustic signal cancellation, in accordance with some embodiments of the presently disclosed subject matter. Diagram 500 discloses systems and components for acoustic signal cancellation. The diagram includes arrows which indicate relationships between the components, and thereby disclose an example method. The systems, components and method of diagram 500 provide an example of acoustic signal cancellation, in a case where a synchronized reference signal 309 is generated based on the reference signal 307. The particular example of reference signal synchronization, disclosed with reference to FIG. 5, deals with a case of a shared content consumption.

The television or other second device 110 gains access to external source 160, to enable playing of the shared content. Device 110 obtains/receives/downloads 507 the content from the external source 160, e.g. from Content Delivery Network (CDN) 160. If the content is protected, e.g. by Digital Rights Management (DRM), the second device 110 interacts and interfaces 503 with a system such as DRM system 377, so as to gain access to the content. The content is played over the air into the space of Bob's physical room, as user Bob 105 consumes it. The sound output 511 from the TV set 110 is second acoustic signal 119.

User Bob 105 is talking, e.g. to the friends Albert and Carla 140 in his shared group. The sound 109 of his voice, the acoustic signal output by Bob, is indicated by 514.

The sound of Carla's voice arrives, over communication network 150 (not shown in this figure, shown in FIG. 1), as an electrical signal from her third user device 143. This is represented schematically by the broken lines around reference 143. Carla's voice is output 126, utilizing loudspeaker 123, as an acoustic signal indicated by 512.

The various sounds 511, 512, 514 all are captured by audio capture device 121. This capture of all of the acoustic signals is represented schematically by the plus sign, combining them. The audio capture device converts the captured acoustic signal 128 to captured signal 519, 518, in electrical format. It is output by the microphone 121 towards other components within user device 120.

In some other examples, the microphone 121 is external to, but associated with, the user device.

In some example, Carla's voice is also routed, by circuit 220 (not shown in this figure), to AEC adaptive filter 450, 226. Also captured signal 519 is fed 517 into the AEC adaptive filter 450. The filter performs filtering, e.g. as disclosed with reference to FIG. 2, and schematically it outputs 516 a signal that cancels the component 512 of Carla's voice. That is, filter 450 cancels Loudspeaker Enclosure Microphone (LEM) echo arriving from third devices 143 (also referred to herein as the Far End), e.g. those devices in the same watching party as the user device 120. The captured signal after AEC filtering is denoted by 518.

Note that the use of adaptive filter 450, 226 is optional to the presently disclosed subject matter, and provides the optional technical advantage of cancelling echo based on sound coming from remote third devices 143.

The frames of the resulting captured signal 518 are fed into ASC adaptive filter 326. In at least this sense, the acoustic signal cancellation system receives the captured signal 518 indicative of the captured acoustic signal 128. The filtering process in filter 326 is disclosed further herein, after discussion of synchronization and of handling of the reference signal 307.

In some examples, captured signal 518 is referred to herein as a post-AEC-filter captured signal 518, to distinguish it from captured signal 519 which exits audio captured device 121. Signal 519 includes the echo from Carla's 140 voice 512.

Reverting to second device 110, in the non-limiting illustrative example of FIG. 5 the user device 120 and the second device 110, as well as third device 143 and device 147, are performing shared consumption of a common content. In such a case, the second acoustic signal 119 is associated with the common content. The user device 120 and the second device 110 are paired, and join the same virtual "room", i.e. the same shared consumption session of the particular content.

As part of this shared consumption, in some examples these devices are synchronized to a reference position referred to herein as a common content time position, also referred to in some examples as a common content position, a shared content synching position or as a room position.

In some examples, this common content time position is expressed as the combination of two times: (a) an absolute shared common clock time of the devices and (b) a position in time of presentation of the content. This latter time is e.g. a position of a content frame, with reference to some reference time, such as a relative position of the content from its beginning (e.g. the start of the TV show, the movie, the song, the sports game).

In some examples, the absolute time is a system corrected using e.g. Network Time Protocol (NTP). In some examples, all devices participating in the shared consumption are synched to this shared absolute time, within a tolerance of e.g. a few tens of milliseconds, e.g. within 1-2 frames of content.

As one illustrative example, the group watches a movie from its start, for 10 minutes. They start watching at the common clock time 10:01:14 UTC. The room position after these 10 minutes is expressed as "(600,000 milliseconds from the start of the content, 10:11:14 UTC)", for example. For ease of exposition, the common content position/common room position is expressed as (X, Y), where X is the position of time of presentation of the content, and Y is the common clock time.

The user device 120 is in some examples configured to determine whether its position in the content is nearly synchronized with the reference position. For example, the user device 150 can calculate a distance between the reference position and the device's position, and determines whether the user device meets a threshold distance.

For the sake of clarity, the term "nearly synchronized" may be used herein to imply the possibility of an allowed tolerance in the position of the player in the device and position of the room. The allowed tolerance ensures that each user, when playing the content on its user device, will hear and see the same events in the content, e.g., a goal in the game, at sufficiently close points in time, such that it will not be discernible that they did not experience the goal at different times. This allowed tolerance is in some examples bound by a pre-configured threshold, where the threshold is small enough to keep synchronized play of the content according to the room position, while being tolerant to some latency between the two systems, the virtual room, and the user device 120.

In some examples, the pre-configured threshold can be [−50,50] milliseconds, such that the distance between the player position of a user device 120 and the normalized reference position is within the range of [−50,50] msec. The distance can be calculated by subtracting the position in the content of the player from the position in the content of the normalized reference position.

More example disclosure concerning shared content consumption, and synchronization of consumption across multiple devices, e.g. within a virtual room, can be found in the U.S. application Ser. No. 17/687,917, "Method of Facilitating a Synchronized Play of Content and System Thereof", the contents of which are incorporated herein by reference.

As part of the synchronization process, the TV set 110 (e.g. via its SDK 310), determines that it is not aligned exactly with the common room position. For example, the TV set determines that it is playing 20 milliseconds (ms) later than the room position, that it is 20 ms behind the room position. The TV 110 determines that its playing position in time is (X−20, Y), relative to the common content position (X, Y). In the above example, at time 10:01:14 UTC, the TV was playing at 599,980 ms (=600,000 minus 20) from the start of the content.

More generally, the reference signal synchronization process needs to know the position (X', Y'), in the content, of its paired second device 110. If it does so directly, the user device 120 can synchronize to the TV position directly, without having to make use of a shared content position, or to interface with external synchronization manager 370. If it receives a reference signal 370 comprising the audio, it can cancel the incoming acoustic signal 119, 511 from the TV 100. A use case for such a process is where the shared consumption is directly between the user device 120 and the TV 110.

For example, if time position (X',Y') of the paired device 110 is (1000, 08:00:00), and now the time is 08:00:10, the current paired device position is 10,000 milliseconds. Assuming that it is desired that the user device 120 be ahead of the paired second device 110, and the allowed threshold by the synchronizer is known to be 100 ms, the position to synch to can be set to (1100, 08:00:00). In such a manner, the reference signal will be maintained between 0 to 100 ms ahead of the captured signal 518. (To that, the estimated audio delay can be added, and the position tuned accordingly.)

In some examples, more generally, the components of user device 120, disclosed with reference to FIG. 5, are configured to synchronized to any given position. The shared consumption associated with e.g. a watching party is one exemplary use case. Note also, that in a case where the common room time position is known, and the time position of the second device 110 is not known, the process can assume that the second device is within the threshold relative to the common room position, and it can synch so at keep the reference signal ahead of the captured signal 518.

In some examples, the second device 110 sends 509, 530 to the user device 120 with which it is paired, one or more items of synchronization information.

In some examples, the information is sent to ASC position calculator module 410 of the acoustic cancellation system of the user device. This information can facilitate generation of a synchronized reference signal 309. In some examples, the performing of the synchronization is based at least on the item(s) of synchronization information.

In some examples, the item(s) of synchronization information are sent directly from the second device 110 to the user device 120. In some other examples, the item(s) of synchronization information are sent from the second device to the user device via a fourth device or system 370, which is distinct from second device 110. One example of fourth device 370 is a synchronization manager 370, which in some examples comprises part of a back-end system or back-end cloud which are configured to enable the shared content consumption.

In some examples, the transmitted item(s) of synchronization information comprise one or more of the following:
  a. the common content position (e.g. room position)
  b. the distance in time of the second device 110 from the common content position (e.g. the time (X−20, Y) is 20 ms behind the room position (X, Y)).
  c. that the second device has started playing the content.
  d. the audio track which is currently being played by the second device (referred to herein also as the currently played audio track)
  e. information to facilitate an accurate calculation of audio delay time. (Audio delay time is disclosed further herein, e.g. with reference to FIG. 6).

Note that the audio track information, is in some examples, important information to know, in order to enable acoustic signal cancellation. Consider a case where a football game, for example, is being broadcast, with multiple audio tracks synched to the video (for example in different languages). The user device 120 must know which audio is currently being played on TV 110, as to obtain the correct corresponding audio reference signal 307.

Non-limiting examples of information to facilitate an accurate calculation of audio delay time include one or more of: the physical position of the second device 110 within Bob's physical room, whether the second device is using external rather than internal speakers etc. Further details on such information are disclosed further herein, with reference to FIG. 6.

Headless player obtains/receives/downloads 532 (e.g. via a pull request, or as a push) the reference signal 307, e.g. from external source 160, or from second device 110. That is, in some cases it receives audio frames of the content (e.g. TV show, radio program, film) which is also being output by the TV 110 as acoustic signal 119. As will now be disclosed, in some cases this reference signal must first be synchronized with the incoming captured signal 518, 519, thereby generating a synchronized reference signal 309, in order for Acoustic Signal Cancellation to work correctly.

In some examples, the ASC position calculator 410 performs one or more of several actions to find a time position, to which the reference signal 307 must be synchronized. In some examples, the generation of the synchronized reference signal 309 is based at least on maintaining a particular time position of the electrical reference signal. This time position is referred to herein also as a first time position. More details on the time position are disclosed below.

Firstly, ASC position calculator 410 in some cases knows the maximum permissible delay. In some examples, this maximum delay is based on the ASC filter 326 design. As will be seen, and as disclosed with reference to FIG. 3, the ASC filter uses the reference signal to cancel the second acoustic signal 119 within the captured signal 518, 519, 554 which is captured by the microphone 121.

Consider an example where the maximum permissible delay is 500 ms. In such a case, if audio frames of the captured signal, and audio frames of the reference signal, represent content that is more than 500 ms apart, there is no reference signal audio frame, which has the sound "Goal!" (for example), available to cancel a corresponding frame of the captured signal which has the same sound "Goal!".

In some examples, the ASC adaptive filter 326 can cancel a second acoustic signal if a corresponding audio frame in reference signal buffer 480 is found. Therefore, if the reference signal buffer 480 is of size 500 ms, and the reference signal is e.g. 550 ms old, more than the buffer size, the reference signal audio frame containing "Goal!" will no longer be in the buffer, and the filter will not find it in the buffer. The filter thus be unable to reduce/remove/cancel the sound "Goal!" from the captured signal 554.

In some examples, the calculator 410 can obtain or receive this maximum permissible delay value from the ASC filter 326. In another example, the maximum permissible delay is a configurable parameter of the ASC position calculator 410.

Secondly, in some cases e.g. a joint shared consumption of a content, the ASC position calculator 410 knows the value of the distance threshold of the particular virtual room associated with the joint consumption. In some implementations, this room distance threshold, also referred to as a threshold distance associated with the shared consumption, can be a parameter which indicates the maximum distance in time which the user device 120, when joining the virtual room, should have from the reference position set by that room. In some other implementations, the room distance threshold can be a parameter which indicates the maximum distance in time which any two devices in the virtual room should have from each other, when playing the content. Each device tries to synch up with the determined common time position of the room/watching party.

Assume, as an illustrative example, that the room distance threshold is 100 ms. If, at minute 10 of the game, user device 120 is 70 ms ahead of device 143, less than the threshold, each will hear and see the goal at sufficiently close points in time, that it will not be discernible that they did not experience the goal at different times. Bob and Carla will be able to talk and chat with each other about the goal they both saw. On the other hand, if the user device 120 is e.g. 1 second ahead of device 143, more than the threshold, it will be discernible to the members of the party that Bob heard the goal ahead of Carla, and Bob may chat to Carla "How about that goal?" before Carla even experiences the goal.

This threshold in some cases drive the maximum time distance that any device in the group can be from the shared room position. For example, each device can be instructed to synch (using a synching algorithm, disclosed further herein) to within 50 ms ahead of or behind the room position, so that the maximum distance in time between any two devices (one at X+50, one at X−50) will be within the 100 ms threshold.

This room distance threshold parameter can be used, in some examples, in the reference signal synchronization process. In some examples it is a configurable parameter. In some examples, the parameter value can be defined per room, based on the particular content, the characteristics of the devices, and/or the characteristics of the relevant communications networks. In some examples, the threshold can be dependent on the maximum permissible delay that the ASC filter 326 can support or accommodate. In some examples, the threshold can be less than the maximum permissible delay. Thirdly, in some examples, the ASC position calculator 410 calculates a predicted audio delay of the first acoustic signal 128, that is an audio delay associated with the captured signal 518. This parameter, the predicted audio delay, is indicative of a time of availability of the captured signal 519 for the acoustic signal cancelling by filter 326. In some examples, the delay is between a presentation time of the audio at second device 110, and the time that the corresponding portion of the second acoustic signal 119 arrives at the filter 326 within a frame of the captured signal. As disclosed further herein with reference to FIG. 6, in some examples it includes delays in the output device 110, signal travel time in the room, and delay in the capture device 120.

In some examples, this audio delay can determine the availability time of the audio signal for audio signal cancelling by filter 326. The predicted audio delay can be an estimated audio delay.

Figure 6:
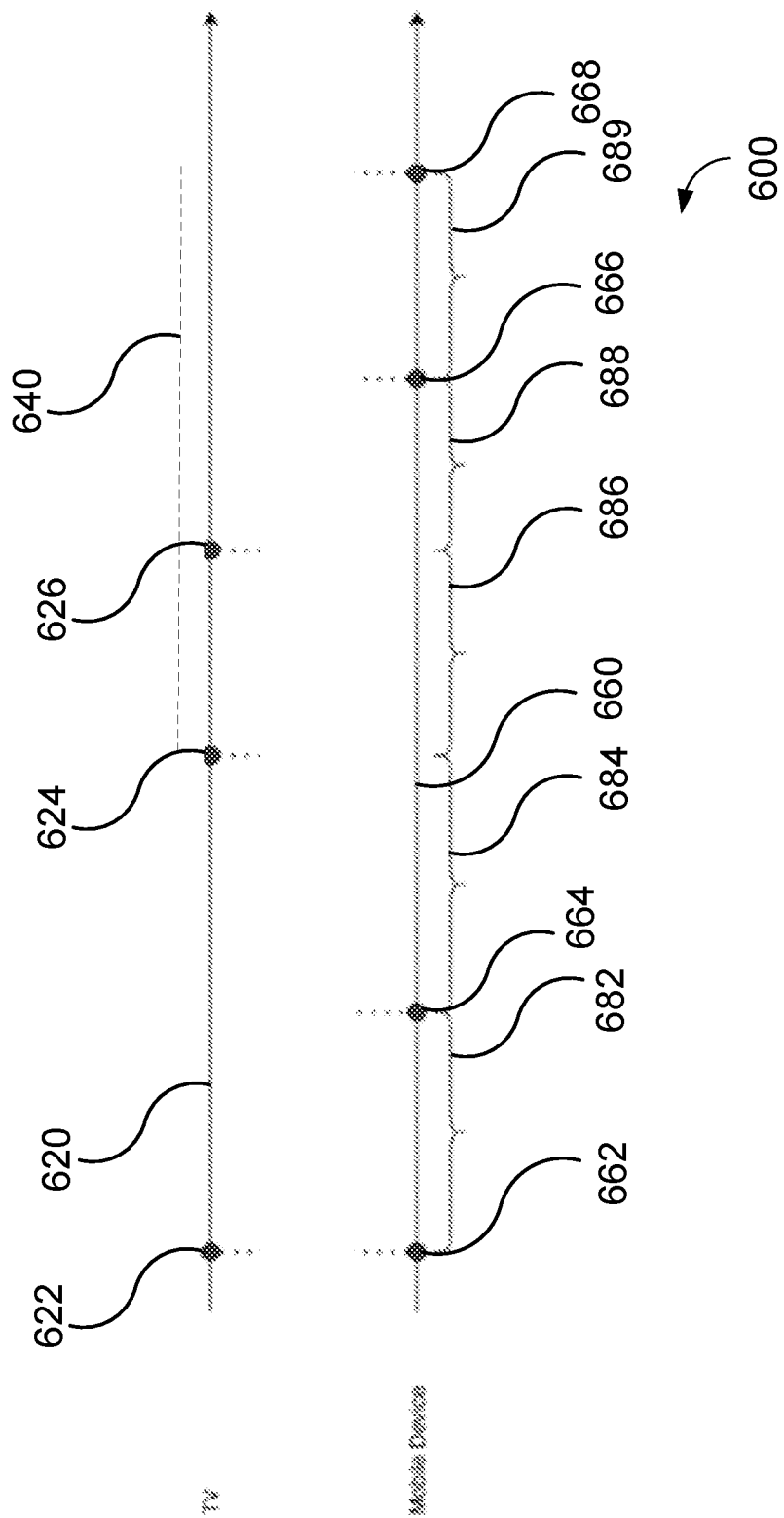
FIG. 6 illustrates schematically an example generalized schematic diagram of audio delay, in accordance with some embodiments of the presently disclosed subject matter.

More detail on illustrative examples of audio delay is disclosed further herein with reference to FIG. 6.

In some examples, the calculator 410 performs an initial prediction of the delay, and subsequently can perform calculations (as disclosed further herein) based on feedback from actual measurements.

In some examples, the generated synchronized reference signal 309 has a defined level of delay relative to the captured signal 518. This delay ensures that when an audio frame is received in the captured signal, the corresponding frame in the synchronized reference signal is already available. The generation of the synchronized reference signal 309, in such a case, is based on maintaining the first time position of the synchronized reference signal, within the defined level of delay, such that the first time position of the synchronized reference signal is ahead of a second time position of the captured signal 518. In some examples, the defined delay level can be zero.

In some examples, it is advantageous that the handling of the captured signal is not delayed. It is preferred, in such a case, to not buffer the incoming frames of the captured signal and make the frames wait until a later-arriving matching reference signal 307 arrives. Recall that the captured signal 518 comprises mostly Bob's voice. If such a delay occurs, this adds latency to e.g. Bob's 105 call with the third user device 143, and makes for a conversation of decreased quality with the other device.

Fourthly, in some examples, the ASC position calculator 410 calculates a modified common content position. That is, the user device 120 will then try to seek to this position, that is to synch the reference signal to this modified common content position, rather to the original common content position (i.e. the original room position of the virtual room).

As disclosed further herein, in some examples the synchronization of the captured signal 518 with the reference signal 307 is based on the modified common content position.

In some examples, the calculation of the modified common content position is based at least on the common content time position, on the maintaining of the time position of the synchronized reference signal and on the predicted audio delay. In some examples, the calculation of the modified common content position is based at least on the distance in time of the second device 110 from the common content position. In some examples, the calculation of the modified common content position is based at least on the threshold distance associated with the shared consumption of the content, e.g. the maximum threshold of the watching party virtual "room". (Again, as disclosed above, in other examples the time position of the second device 110 is known, and the user device 120 can synch to that position.)

In some examples, the position calculator 410 utilizes the one or more items of synchronization information 530, which associate the second acoustic signal 119 with the reference signal 307.

Illustrating the modified common content position with one non-limiting example, assume that the distance threshold is 100 ms. It might be desirable in such a case to have the devices synch to within a range of [−50, +50] ms around the current common content position X. However, in this example, the ASC position calculator 410 aims to synch the received reference signal 307 to within a range of [0, 100] about the current common content position X, a range having the same threshold of 100 ms. The reason is that calculator 410 was informed that the second device 110 is 20 ms behind X. It therefore chooses the alternate range [−20, −20+100]=[−20, 80] around X. In order to ensure that the synchronized reference signal 309 will be ahead of the captured signal 518, 554, it moves the range by 50 ms. The calculator 410 therefore requests that the reference signal be synchronized to the modified common content position of (X+30, Y). Recall that Y is a common clock time.

This value of the position will ensure that the reference signal will be synched to +/−50 ms around the X+30 position, and will thus synch to a position between X+30−50=X−20 and X+30+50=X+80. Since the low end of this range is X−20, in all cases the reference signal will be ahead of the TV signal, which is at X−20. Note that X−20 is the 0, and X+80 is the 100, within the target range of [0,100]. That is, synching to X+30 within a [−50, +50] range is the same as synching to TV position X−20 with a range of [0, 100].

The threshold of the media synchronizer can be controlled, so that the reference signal 309 delay from the captured signal 518 will be within the allowed ASC delay. For example, assuming the audio delay is 50 ms, and the allowed ASC filter delay is 200 ms, the range can be kept when synching to [0,140]. In the example architecture of the figure, ASC position calculator 410 sends 540 the modified common content position to the shared content synchronizer 413. Thus, module 410 instructs 540 module 413 to synchronize the reference signal to the position (X+30, Y), with a range of [−50, +50]. This is the position to which the headless player 417 should seek. These are example parameters sent to synchronizer 413.

In some examples, shared content synchronizer module 413 runs algorithms to attempt synchronize the Headless Player 417, and thus received reference signal 307, 532, to the selected position (X+30, Y). In some examples, the algorithms run are those which are run also by the modules or other software components 310, 340 which reside on the other devices 110, 143, in their attempts to synchronize their media players to the common content position, or alternatively to synchronize to the relevant modified common content position which is associated with that particular device. More example disclosure concerning such synchronization algorithms can be found in the U.S. application Ser. No. 17/687,917, "Method of Facilitating a Synchronized Play of Content and System Thereof", the contents of which are incorporated herein by reference.

In some examples, the maximum distance threshold, e.g. 100 ms, is a configuration parameter for shared content synchronizer 413. In some such cases, the algorithm will decide that the devices in the content-consumption group are all synched, if each device is within 50 ms ahead of, or 50 ms behind, the room/shared content position. In some examples, the maximum distance threshold is set to one value for devices to used in a shared content consumption (e.g. watching party), and to a different value for purposes of synching to an ASC synch position, to enable the ASC filtering (e.g. as disclosed in FIG. 5).

In one illustrative example, the synchronization algorithm is told to synch to position (X+30, Y). The algorithm is run, and it synchs the headless player 417 in fact to an actual position of (X+57, Y), That is, the algorithm achieves a distance which is 27 ms ahead of the modified common content position of (X+30, Y). This value of 27 ms is within the +/−50 ms range, and is therefore acceptable. Since the TV position is at X−20, the returned position for the headless player 417 is 77 ms ahead of the second device 110 position of X−20.

This implies that, assuming there is no audio delay between the TV 110 and the ASC adaptive filter 326, the synchronized reference signal 309 will arrive at the filter 77 ms ahead of the captured signal 518, 554. The effect of the actual audio delay on this is disclosed further herein. Since, as disclosed above, the ASC position calculator 410 knows the predicted audio delay, in practice it will instruct the shared content synchronizer 413 to synch to a different value of the modified common content position, to account for the audio delay (which will delay arrival of the captured signal 518). For example, if the predicted audio delay is 100 ms, the synchronizer 413 will instead instruct headless player 417 to seek to (X+30−100, Y)=(X−70, Y).

In the example architecture of the figure, the acoustic signal cancellation system utilizes a headless player 417, which is distinct from the default audio player (not shown) of the user device 143. In some examples, this headless player is a software module responsible for extracting clear raw audio frames matching the audio track on the TV on their presentation time, and for pushing these audio frames to the reference queue 480 or to the ASC filter 326.

The headless player 417 of the acoustic signal cancellation system is configured to access 532 the audio stream of the content, e.g. the shared content being consumed in a joint watching session. That is, it receives the reference signal 307 from external source 160. In some examples, this access is performed using the reference signal interface 322, not shown in this figure.

In some non-limiting examples, e.g. in the case of Adaptive Bit Rate (ABR) protocols such as Hypertext Transfer Protocol (HTTP) Live Streaming (HLS) and Moving Picture Experts Group—Dynamic Adaptive Streaming Over HTTP (MPEG-DASH), the headless player pulls 532 the audio track of the shared content from the external source 160, e.g. from a Content Delivery Network. In some non-limiting examples, e.g. in the case of legacy HTTP downloads, the server of the external source 160 pushes 532 the audio track. In another non-limiting example, the encoded or raw audio is pushed or pulled directly from the TV 110 to the user device 120. This pulled or pushed audio track is the reference signal 307.

The headless player module 417 is "headless", in that it does not output the frames of audio to a rendering surface. Rather, in the example of the figure it is configured to only push frames of audio to the reference signal buffer 480 of the filter 326.

In some examples, the headless player is configured decode the audio stream associated with the reference signal 307, that is to decode the received audio frames.

In some examples, headless player 317 is configured also to decrypt the audio frames of the audio stream, if needed.

In some examples, the audio stream associated with the reference signal 307, 532 is referred to herein as a second audio stream, to distinguish it from the first audio stream of the captured signal 518.

In the example of the figure, the shared content synchronizer 413 is configured to use control and data from the headless player module 417 to synchronize headless player to the relevant common position. The interfaces 543, 547 to the headless player 417 are in some cases standard Application Programming Interfaces (API) of players.

In some examples, the headless player is configured to push 547 the processed audio stream to the reference signal buffer 480, e.g. of queue(s) 335. In turn, audio frames are pushed 550 from the head of the reference signal buffer, e.g. under the control of headless player 417, towards the ASC adaptive filter 326. In at least this sense, the acoustic signal cancellation system receives the synchronized reference signal 309.

Summarizing these three example modules, in the example implementation disclosed with reference to the figure, ASC Position Calculator 410 is configured to calculate the position to which synch should be performed, based on either the TV 110 position, or on the room position+room synch threshold, based also on estimated audio delay and the latency limit of the ASC filter 326. The shared content synchronizer 413, is configured to actually synch the headless player 417 to the ASC position, with the requested synch threshold. The Headless player is configured to extract clear (unencrypted) raw audio frames, and to push to the queue of reference signal buffer 480.

In this manner, for example, synchronization of the captured signal 518 with the electrical reference signal can be performed, and a synchronized reference signal 309 generated from the electrical reference signal 307.

In some examples, synchronized reference signal 309 is referred to as a third signal, or a third audio stream, to distinguish it from others disclosed herein.

In some examples, the synchronization process comprises adjusting the head of the reference signal buffer, at least based on the modified common content position such as (X+57, Y) or (X−70, Y). The head is adjusted, so that the correct referenced signals are made available to the filter at the correct time, relative to arrival of the corresponding captured signal 518. For example, the position of the ASC filter 326 is thus tuned, so that the synchronized reference signal 309 is ahead of captured signal 518, within the ASC latency threshold or limit.

Reference signal 547 sent to the buffer, and reference signal 550 sent from the head of the buffer to filter 326, are examples of synchronized reference signal 309.

In at least also this sense, the acoustic signal cancellation system receives the synchronized reference signal 309.

The above is one scenario of adjusting the reference signal buffer head, based on the initial prediction of the audio delay and the initial calculation of the modified common content position. An additional scenario of further adjusting the buffer head, tuning it on an ongoing basis, is disclosed further herein.

In the example disclosed herein, if the audio delay is e.g. 100 ms, then the synchronized reference signal can arrive at the filter 326, at a point in time 57+20+100=177 msec ahead of the captured signal 518 containing the corresponding second acoustic signal 119. Therefore, the various parameters utilized in the synchronization can in some cases drive the size of the signal buffers 480, 470. The reference signal buffer 480 should be sized so that it is large enough to accommodate a delay, that is to accommodate a synchronized reference signal 550 that arrives e.g. 177 msec before the captured signal 518, 554 arrives at the filter.

More generally, the buffer should be large enough to consider both the room synchronization thresholds plus audio delay. If the buffer size is smaller than the audio delay, and in some examples is smaller than the audio delay plus the synchronization difference between the synchronized reference signal 309 and captured signal 518, there are chances that the filtering process will be negatively impacted. If when the captured signal arrives at filter 326, the synchronized reference signal is no longer in the buffer, the filter, attempting to e.g. match the bits of the audio frames, will not find the corresponding signal in the reference signal buffer 480.

ASC adaptive filter 326 is configured to receive the synchronized reference signal 550, e.g. pushed from the head of buffer 480. The filter 326 also receives 554 the error signal, which is associated with the subtraction of captured signal 518, 519 from predicted far end signal 552. In at least this sense, the acoustic signal cancellation system receives the captured signal 518, indicative of the captured acoustic signal 128. In some examples, filter 326 is configured to perform signal cancelling or removal of the captured signal 518, based on the synchronized reference signal 309, 550.

In some examples, the ASC adaptive filter 326 utilizes an AEC3 algorithm.

The predicted far end signal corresponding to synchronized reference signal 309, and thus to second acoustic signal 119, is indicated as 552, exiting ASC filter 326. Predicted far end signal 552 is subtracted from the captured signal 519, yielding subtracted signal 556. The filtered audio frames of the resulting reduced (subtracted) captured signal are sent 556, 311 to an Audio/Video Communication (AVC) pipe, that is to an output interface, e.g. to audio-video interface 328. This reduced signal can be sent from interface 328 to external communications interface 350 of FIG. 3, to be output and sent 154, 156 to third devices 143. In some examples, this output 556 from the filter 326 is referred to also as publishing to A/V communication 328, 350, toward other participants 122, 140 in the virtual "room".

Recall that in some examples, the third device 143 is synchronized to the common content position. In such a case, if the sound 145 heard from third device 143 includes the second acoustic signal 119, the experience resembles echo, and can be particularly annoying to remote user Carla 140. The system of schematic 500 can this in some cases remove this echo, which is particularly likely to occur in cases of shared consumption of a content (TV, radio etc.) which includes an audio component.

The subtraction process which generates subtracted signal 552 can also generate error signal 554. In some examples, the error signal is fed back 554 to ASC adaptive filter 326.

The above-disclosed synchronization steps, and predictions of audio delay, are in some examples initial actions, based on initial estimations. In some examples, the acoustic signal cancellation system also performs monitoring of an actual audio delay between an availability time of the captured signal 518 and a distance of the synchronized reference signal 309 from the modified common time position. In some examples, this monitoring includes tuning the modified common content time position and the head of the reference signal buffer 480. This can in some cases facilitate a maintenance of the defined level of delay.

Thus, the adjustment of the reference signal buffer 480, based on the initial determination of the modified common content time position, utilizing e.g. a priori known information, is referred to herein also an initial adjustment. Later adjustments performed during ongoing monitoring are referred to herein also as additional adjustments or ongoing/continual adjustments, or as tunings.

In some examples, this monitoring of the actual audio delay comprises performing a correlation of the synchronized reference signal 309 with the captured signal 518, 554. This correlation is performed e.g. by signal correlator 430.

In some examples, the acoustic signal cancellation system comprises captured signal buffer 470 of queue(s) 335. In such a case the captured signal 518, 519 is fed 558 also to the capture signal buffer. For example, the captured signal 518 is pushed to both ASC filter 326 and to captured signal buffer 470.

In such a case, the signal correlator 430 looks for correlation between the electrical reference signal 309 and the captured signal 558, which are in the two buffers. In one example, the correlator runs a generalized cross-correlation phase transform (GCC-PHAT) cross-correlation algorithm. It looks 560, 562 for correlation between the two buffers 470, 480, looking e.g. for the same frame content in audio frames in each of the two buffers. The correlator also computes the delay between the captured 518 and reference 309, 550 signals, e.g. differences in times of arrival, to the ASC filter 326, of a those portions/frames of each signal, which represent a particular portion of the audio content.

Performing such a correlation can in some cases validate that the ASC position calculator's 410 calculation is accurate enough, e.g. that, after calculating the modified common content position and synching to it, the latency between the reference and captured signals is within the filter's 326 maximum permissible delay. In some examples, the correlator 430 provides inputs 573, 577 to the position calculator 410 to better calculate or estimate the audio delay. In some examples, the correlator 430 provides inputs 573 to the reference signal buffer 480, to tune the buffer head if needed.

As an illustrative example, the correlator 430 determines that the delay between the two buffered signals is 179 ms. The correlator knows, from other modules of the cancellation system, that the reference signal 307 was synchronized 309 to be 77 ms ahead of the captured signal 518. In such a case, the correlator determines that the actual audio delay in the system is currently 179−77=102 ms, and not the previously estimated or predicted value of 100 ms.

The signal correlator knows that the ASC filter 326 requires less than 100 ms delay. It will send an instruction 573 to the reference signal buffer, to tune the buffer head correspondingly, to move refence signal frames within the buffer 480, so as to keep within the 100 ms delay requirement. In some examples, the reference buffer 480 is a ring/circular buffer. If some depth is kept between the tail and head of the buffer, it is possible to tune back to earlier audio frames, to be pushed to ASC filter 326 if the delay is too large.

The correlator 430 can in this manner control the delay between the two signals that are pushed to ASC adaptive filter 326. As disclosed further herein, the system can instead update the estimated audio delay, and re-synch to an updated modified content position based on this updated delay.

This information about the actual delay can also be fed back 577 via the reference signal buffer to ASC position calculator 410. In some other example implementations, signal correlator 430 is configured to send directly (not shown), to calculator 410, this feedback information concerning the actual delay.

In some examples, if the common content time position, and the distance of the second device 110 from it, are known, and if the modified common position and the distance from it of the user device 120 are known, the predicted delay between the synchronized reference signal 309 with the captured signal 518 can be calculated. Therefore, any additional measured delay in such a case can be taken to be audio delay.

In some examples, the signal correlator 430 determines that the capture signal 518 is ahead of the synchronized reference signal 309—that is that the time position of the reference signal is behind the second time position of the captured signal. In a case where that situation is not desired, e.g. as disclosed above, tuning the buffer 480 might be insufficient. In such a situation, signal correlator 430 can be configured to instruct ASC position calculator 410 to recalculate, or to predict again, the estimated audio delay, and to recalculate the modified common content time position, or "seek-to" position, to which shared content synchronizer 413 should attempt to synchronize. This instruction can include the actual delay information measured by correlator 430. This instruction can be sent 573, 577 via the reference signal buffer 480, and/or directly (not shown) from module 430 to module 410.

The next time the position calculator 410 is run, it will use the updated audio delay information.

In some examples, if the synched reference signal 309 is ahead of the captured signal 518, by more than the limit of ASC latency, the signal correlator 430 can identify such a situation, and can tune again (either synchronize again to a different time position, or get frames from the queue/buffer 480, i.e. tuning the buffer). In some examples, the ASC filter 326 itself learns the actual delay, as it attempts to find e.g.

corresponding frames in the synchronized reference signal 309, to be used to cancel the relevant portion of the captured signal 518. Thus, the filter 326 itself can send feedback information, concerning actual delay, reporting the filter performance, reporting its updated estimate of the audio delay, whether sent 570 to the signal correlation 430, or in some examples (not shown) directly to the reference signal buffer and/or to the position calculator.

In some examples, the filter 326 reports on its performance, and if it below some threshold, the decision can be made that the required latency between signals has been lost. This can occur, for example, if the user 105, 120 came closer to the TV 110, or if an plugged external loudspeaker is plugged into the TV 110.

Thus, more generally, downstream components can report to those components that are performing synchronization of reference signal 307 with captured signal 518, to re-synch, and/or to re-perform calculations used to determine synchronization parameters.

The acoustic signal cancellation system can thus be configured to tune the reference signal buffer 480 head, and or the calculation of the modified common content time, so as to achieve the desired delay between synchronized reference signal 309 and captured signal 518. This results in the tuning of the signals delay, between the synchronized reference signal 309 and captured signal 518.

Note that in some examples, if the estimated audio delay is too low, that is it is less than the actual audio delay, the sync reference signal 309 can end up ahead of the capture signal 519 by more than the latency allowed by ASC filter 326. In such a case, there may be a need to tune it to an earlier audio frame (if there are such frames back in the buffer), or to recalculate the estimated audio delay and to synch again.

Similarly, if, in some examples, the estimated audio delay is too high (i.e. the actual delay is lower), the captured signal 518 can end up preceding the synched reference signal 309. In such a case there may be a need to recalculate the estimated audio delay, and to synch again (rather than delaying the captured signal, which in some cases is not desirable).

In some examples, where the reference signal 307 is sent to user device 120 directly from second device 110, if the synchronization is not working well enough, the user device can instruct the second device to e.g. send it the signal earlier than it is currently doing.

Note that the monitoring process disclosed herein is in some implementations performed continually, or in a continuous manner, so as to ensure that the delay is controlled within the defined limits throughout the content consumption session.

In some examples, the performance of cross-correlation in signal correlator 430 is computationally heavy, and it preferable that it not run continually all of the time. Rather, it should be run only when synchronization is required. In such a case, it is run initially at the start of the process, when no synchronization point is known. Optionally, at specific later times, when the ASC adaptive filter 326 reports 570 that there are problematic delays, and that the synchronization is not working well, the correlator 430 can run the algorithm. In some examples, the correlation is performed instead, or additionally, at regular defined intervals, as part of an ongoing monitoring process.

In some examples, the optional addition of synchronization methods and components, such as disclosed with reference to FIG. 5, provides at least some example technical advantages. Such a method can in some cases prevent the delay between the reference signal 307 and captured signal 518 from being too large, compared to the capabilities of the ASC adaptive filter 326, and thus can ensure that signal canceling of the second acoustic signal 119 can be performed.

Also, in some cases such a method will prevent the situation of buffering the incoming frames of the captured signal 518 and make the frames wait until a later-arriving matching reference signal 307 arrives, a situation which can negatively affect the voice call/conversation/chat experience between Bob 105 and Carla 140.

Note that in FIG. 5, not all modules of the processor, as disclosed in FIGS. 3 and 4, are shown.

In some examples, some or all of the modules 322, 324, 410, 413, 417, 335, 470, 480, 326, 430, and in some cases also 329, are collectively referred to as being comprised in an acoustic signal cancellation system.

Note that in some implementations, the acoustic signal cancellation system is not always active when user device 120 is on and active. To reduce unnecessary load on the process 320, in some cases the cancellation-related components are active only when a reference signal 307 is received or detected 532. For example, when Bob 105 begins to watch a TV show as part of a virtual "room" of a watching party, the shared content module 329 in some cases requests acquisition of reference signal 307, so as to cancel the sound 119 of TV 110 from the user device's output audio signal 156. In one example, this occurs because shared consumption module 329 received an indication that Bob's local second device 110 has also joined the virtual watching "room". Only when the reference signal begins to arrive at reference signal interface 322, will the ASC begin to function. The receipt of the reference signal is an indication to the acoustic signal cancellation system that the captured signal 519, 518 now includes components of the second acoustic signal 119 of TV 110. Also, only at that time will the synchronization process of reference signal 307 and captured signal 518 begin. Similarly, when the shared consumption ends, and the virtual "room" ends, the acoustic signal cancellation, and any related synchronization, will stop.

Thus, in a case where Bob consumes content e.g. in a shared watching party, not via a second device which sends acoustic signals 119 towards his microphone 121, the canceling system in some examples does not function. For example, consider a case in which Bob goes out of the house, and watches the shared content directly on a TV/video/radio app of his user device 120, while also talking with Albert 122 and Carla 124. The shared content module 329 in some such cases detects that Bob's shared consumption is directly via user device 120, and thus does not request acquisition of reference signal 307. For example, in such a case the module 329 does not receive an indication that Bob's second device 110 has joined the virtual watching "room". Only when Bob watches at home, on his paired devices—TV 110 and phone (or other user device) 120, does the ASC process operate.

Note also that, as disclosed above, in some implementations the user device 120 obtains the reference signal 307 from second device 110, directly in a peer-to-peer fashion, without accessing back-end systems such as content source 160 and synchronization manager 370 which serve a virtual shared "room". In some such cases, there is no need to synch reference signal 307, using synch methods and algorithms such as those disclosed with reference to FIGS. 5 and 8. Rather, in such a case the synchronization is based on when TV 110 sends the reference signal.

Note also, that in implementations which do not utilize Adaptive Filter 226, 450, the input captured signal 554, 518 to ASC filter 326 is the captured signal 519 arriving from audio capture device 121.

Note that FIGS. 3 and 8A-8C illustrate only one exemplary implementation of synchronization of reference and captured signals that are to be utilized for the acoustic signal cancellation. Other implementations are possible.

FIGS. 3-5 illustrate only a general schematic of the system architecture, describing, by way of non-limiting example, certain aspects of the presently disclosed subject matter in an informative manner, merely for clarity of explanation. It will be understood that the teachings of the presently disclosed subject matter are not bound by what is described with reference to FIGS. 3-5.

Only certain components are shown, as needed, to exemplify the presently disclosed subject matter. Other components and sub-components, not shown, may exist. Systems such as those described with respect to the non-limiting examples of FIGS. 3-5 may be capable of performing all, some, or part of the methods disclosed herein.

Each system component and module in FIGS. 3-5 can be made up of any combination of software, hardware and/or firmware, as relevant, executed on a suitable device or devices, which perform the functions as defined and explained herein. The hardware can be digital and/or analog. Equivalent and/or modified functionality, as described with respect to each system component and module, can be consolidated or divided in another manner. Thus, in some embodiments of the presently disclosed subject matter, the system may include fewer, more, modified and/or different components, modules and functions than those shown in FIGS. 3-5. To provide one non-limiting example of this, in some examples results headless player module 417 is comprised within shared content module 329. Similarly, in some examples ASC position calculator module 410 and shared content synchronizer module 413 are combined.

One or more of these components and modules can be centralized in one location, or dispersed and distributed over more than one location, as is relevant. In some examples, certain components utilize a cloud implementation, e.g. implemented in a private or public cloud.

Each component in FIGS. 3-5 may represent a plurality of the particular component, possibly in a distributed architecture, which are adapted to independently and/or cooperatively operate to process various data and electrical inputs, and for enabling operations related to a computerized hearing test. In some cases, multiple instances of a component may be utilized for reasons of performance, redundancy and/or availability. Similarly, in some cases, multiple instances of a component may be utilized for reasons of functionality or application. For example, different portions of the particular functionality may be placed in different instances of the component.

Communication between the various components of the systems of FIGS. 3-5, in cases where they are not located entirely in one location or in one physical component, can be realized by any signaling system or communication components, modules, protocols, software languages and drive signals, and can be wired and/or wireless, as appropriate. The same applies to interfaces such as modules 322, 350, 328.

Attention is drawn to FIG. 6, schematically illustrating an example generalized view of audio delay, in accordance with some embodiments of the presently disclosed subject matter. Example diagram 600 depicts two timelines 620 and 660, schematically depicting events or actions in the second device 110 and in the user device 120, correspondingly. In the example of the figure, the second device is television set 110, and the user device is mobile phone 120.

In the non-limiting illustrative example of the figure, the two devices receive the audio stream from the content source 160 simultaneously, at the same points in time 622, 662. Internally in the user device 120, there is a processing delay 682, until the point in time 664 at which the audio stream (e.g. Pulse Code Modulation (PCM) data) is buffered, e.g. in reference signal buffer 480. The audio frames received at TV 110, e.g. over an internet connection, are written to the TV's audio subsystem at point 624. This time interval 684 is referred to herein also as buffering delay 684. Point 624 in time is referred to herein also as the presentation time 624 in the TV 110.

From the point 624 to point 626, at which the audio signal exits the TV's loudspeakers as second acoustic signal 119, the time interval is referred to herein as second device system delay 686.

Note that, if the loudspeakers are external to the TV set 110, e.g. connected to the TV by a wired or wireless electrical connection, this may in some cases increase the system delay. In some examples, TV set 110 is configured to send, to user device 120, such additional items of information. Such items of information can in some examples be used for a more accurate prediction or estimation of the audio delay. Such items of information can be sent directly, or indirectly (e.g. via synchronization manager 370).

Air delay 688 is the time interval from point in time 626, to point 666, at which the second acoustic/audio signal 119, comprised in acoustic signal 128, is captured by the phone's microphone 121.

Note that, in some examples, the TV set 110 is configured to send the user device 120 information on its accurate position with the room (whether directly or indirectly), and also the user device is configured with accuracy its own with the room, In some examples, TV set 110 is configured to send, to user device 120, such additional items of information. Such items of information can in some examples be used to measure a distance between the two devices. This in turn can be used to measure the air delay in an accurate matter, e.g. based on the distance and on the known speed of sound. Thus, the receipt by used device of such additional items of information can be used for a more accurate prediction of the audio delay.

There is an additional time interval of system delay 689, that of the user device 120, from the capture 666 at the microphone until the time 668 at which captured audio signal 519, 518 is available at ASC adaptive filter 326 and is ready for signal cancelling.

The total audio delay 640, in the example, is the time interval between presentation time 624 at the second device 110, and time 668 of availability of the captured signal 518 at the filter 326. It is indicated in the figure by a dashed line. In some examples, this is the audio delay predicted or estimates, and in some cases re-estimated, by ASC position calculator 410 in FIG. 5.

Figure 7:
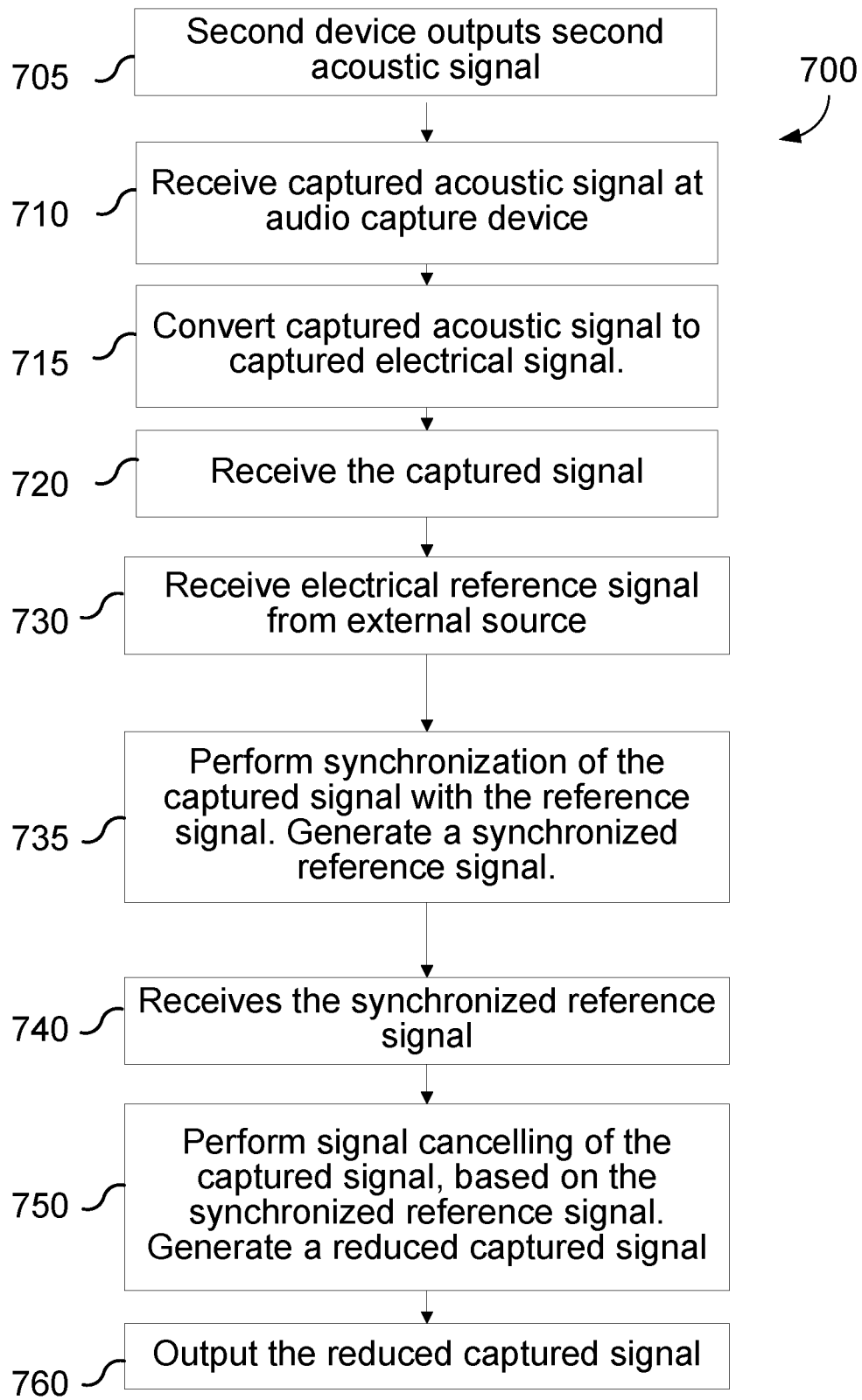
FIG. 7 schematically illustrates one example generalized flow chart diagram, of a flow of a process or method, for acoustic signal cancellation, in accordance with some embodiments of the presently disclosed subject matter.
Figure 8A:
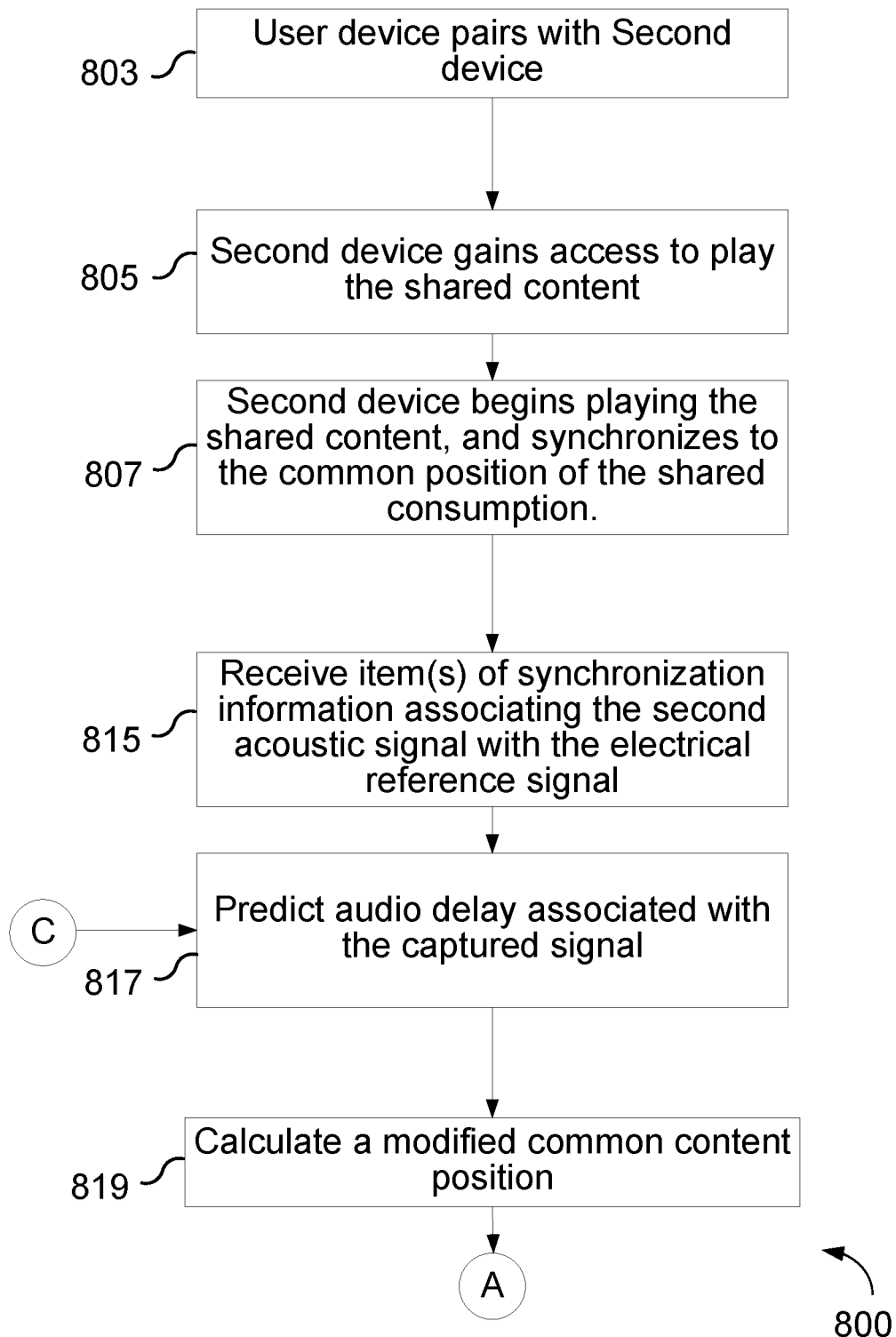
FIGS. 8A to 8C schematically illustrate one example generalized flow chart diagram, of a flow of a process or method, for reference signal synchronization, in accordance with some embodiments of the presently disclosed subject matter.
Figure 8B:
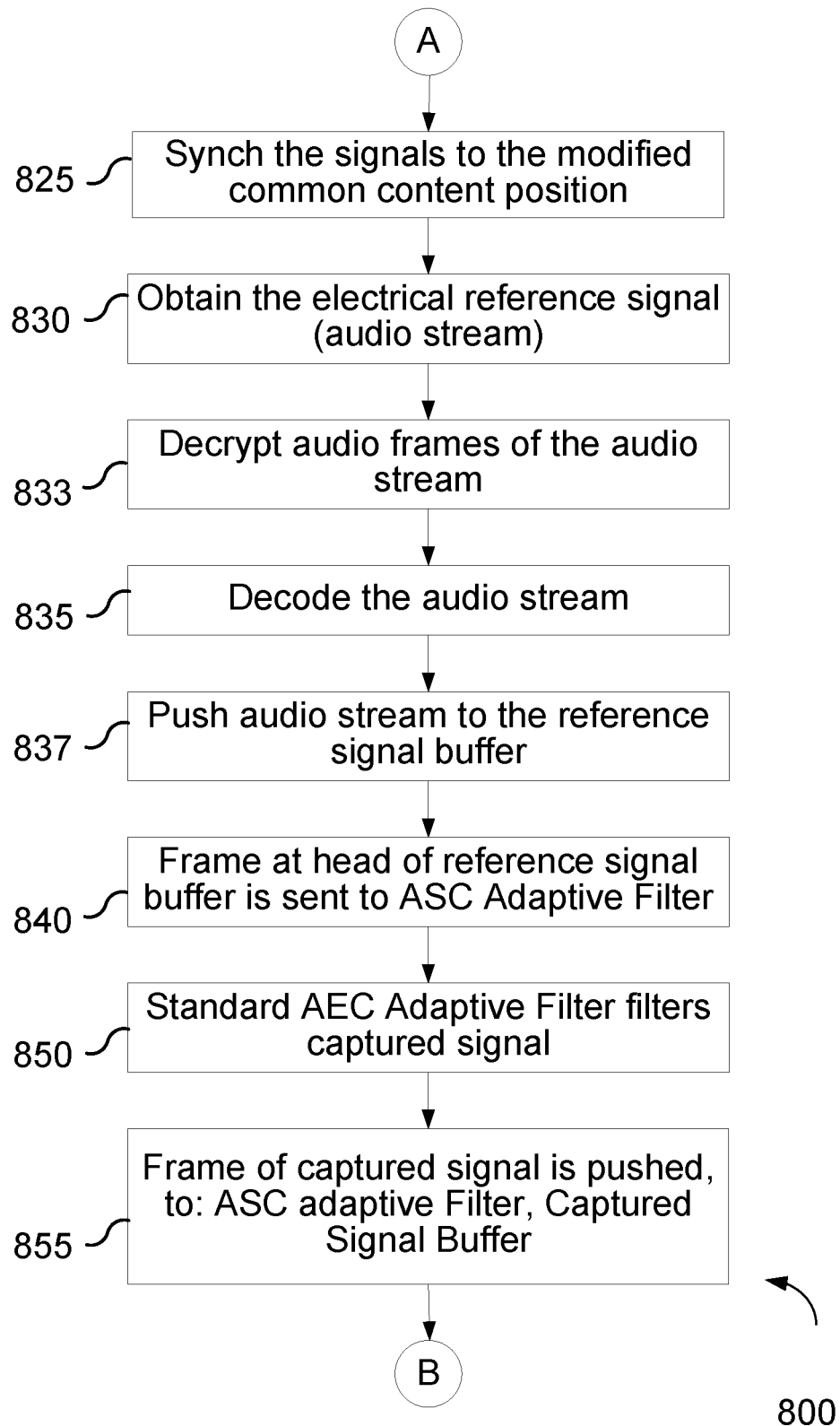
Figure 8C:
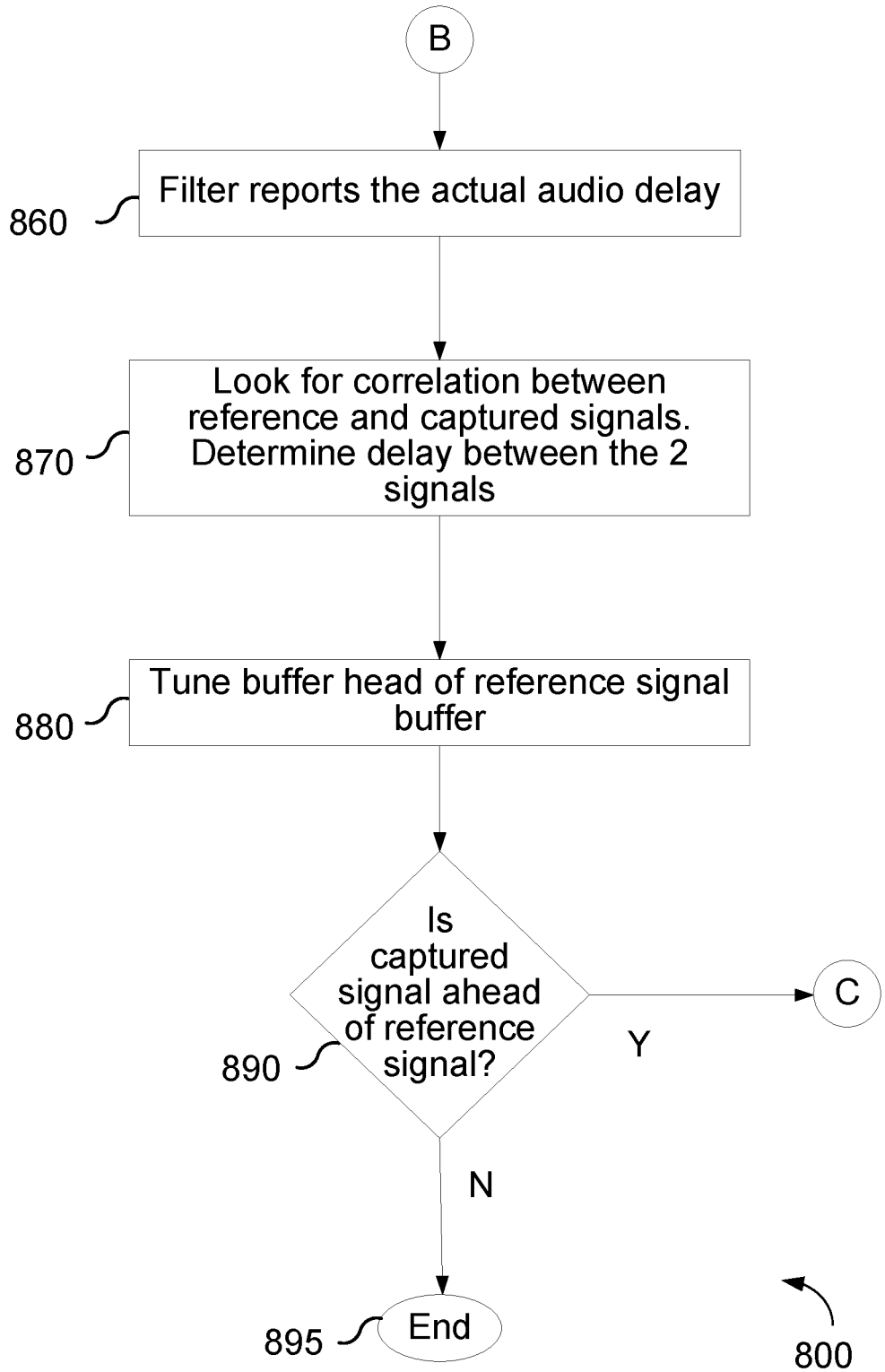

FIGS. 7-8C provide detailed flows of the computerized method or processes 700, 800 for acoustic signal cancelling and for synchronization of reference signals 307.

Attention is drawn to FIG. 7, schematically illustrating a generalized flow chart diagram, of a flow of a process or method, for acoustic signal cancelling, in accordance with some embodiments of the presently disclosed subject matter. This process is, in some examples, carried out by systems such as those disclosed with reference to FIGS. 3 and 5. The flow starts at 705. According to some examples, the second device 110, e.g. a TV set, generates and outputs second acoustic signal 119 (block 705).

According to some examples, the captured acoustic signal 128 is received at audio capture device 121, e.g. a microphone (block 710). In some implementations, the audio capture device 121 is comprised in the user device 120. In some examples, this first acoustic signal 128 comprises the second acoustic signal 119. The user device and second device are distinct from each other.

According to some examples, the captured acoustic signal 128 is converted to a signal 518, 519 that is in electrical form (block 715). In some examples, this is performed by capture device 121. The captured signal is thus indicative of the captured acoustic signal.

According to some examples, the error signal 554, resulting from the subtraction of the predicted far end signal 552 from the captured signal 518, 519 is received 554 by the acoustic signal cancellation system (block 720). In some examples, it is received by ASC adaptive filter 326. This filter 326 is comprised, in some examples, in the user device.

According to some examples, reference signal 307 is received 532 by the acoustic signal cancellation system (block 730). In some examples, this is performed by reference signal interface module 322 of processor 320, of the processing circuitry 315 of the acoustic signal cancellation system. In some examples, the cancellation system is comprised in user device 120. In some examples, the reference signal is received from an external source, e.g. external content source 160 or second device 110. In some examples, the reference signal being is of a content, e.g. a TV show, that is included in the second acoustic signal 119.

According to some examples, a synchronized reference signal 309 is generated, based on the reference signal 307 (block 735). In some examples, this generation results in the content of the synchronized reference signal and the content that is included in second acoustic signal 119 are time-synchronized. In some examples, the synchronization of the captured signal with the reference signal are performed.

In some examples, this is performed by various modules of the acoustic signal cancellation system, e.g. comprised in processor 320 and in memory 330. In some examples, at least the following modules are utilized: ASC position calculator 410, shared content synchronizer 413 and headless player 417 of reference signal extractor 324; signal correlator 430, the ASC filter 326, and the captured and reference signal buffers 470, 480. More detail on the synchronization process is disclosed, for example, with reference to FIGS. 5 and 8A-8C.

This block 735 is optional, in that it is performed, in some examples, in a case in which the content of the reference signal 307, and the content that is included in second acoustic signal 119, are not time-synchronized. In a case, on the other hand, in which the content of the reference signal and the content that is included in second acoustic signal are time-synchronized, this block can be skipped. Instead, the system can simply set the reference signal 307 to constitute a synchronized reference signal 309. In such a case, the reference signal and the synchronized reference signal are the same According to some examples, the synchronized reference signal 309 is received 550 (block 740). In some examples, the signal is received by ASC adaptive filter 326 of processor 320, of the processing circuitry 315 of the acoustic signal cancellation system.

According to some examples, acoustic signal cancelling of the captured signal 519, 518 is performed (block 750). The cancelling is of that portion of the captured signal which corresponds to the second acoustic signal 119. The cancelling is performed based on the synchronized reference signal 309. The predicted far end signal 552 is subtracted from the next frame(s) of captured signal 518, 519. A subtracted or reduced captured signal 311, 556 is thereby generated. In some examples, this block is performed by ASC adaptive filter 326.

According to some examples, the subtracted or reduced captured signal 311, 556 is output (block 760). In some examples, the output is to the third device 143. In some examples, this block is performed utilizing Audio/Visual interface module 328, e.g. interfacing via external communications interface 350. In some examples, the signal is sent 154, 156 to the third device, over a communications network 150.

Attention is now drawn to FIG. 8A, schematically illustrating a generalized flow chart diagram, of a flow of a process or method, for reference signal synchronization, in accordance with some embodiments of the presently disclosed subject matter. In some examples, all or part of this flowchart exemplify a detailed implementation of block 735 of FIG. 7. This synchronization process is, in some examples, carried out by systems such as those disclosed with reference to FIGS. 4A, 4B and 5.

The flow starts at 805. According to some examples, the user device 120 pairs with the second device 110 (block 803). For example, they both join the same virtual "room".

According to some examples, the second device 110 gains access to play the shared content (block 805). For example, device 110 obtains/receives/downloads 505 the content from the external source 160, e.g. from Content Delivery Network (CDN) 160.

According to some examples, the second device 110 begins playing the shared content (block 807). In some examples, device 110 also synchronizes to the common position of the shared consumption (e.g. the virtual "room" position), e.g. utilizing the interface 509 to synchronization manager 370, and utilizing the device's SDK 310.

According to some examples, item(s) of synchronization information, associating the second acoustic signal 119 with the electrical reference signal 307, are received 530 (block 815). This is carried out, in some examples, by ASC position calculator 410, utilizing the reference signal interface 322.

According to some examples, the audio delay associated with the captured signal 519, 518 is predicted (block 817). This is carried out, in some examples, by ASC position calculator 410. In some cases this predicted audio delay is indicative of a time of availability of the captured signal for the acoustic signal cancelling at filter 326.

According to some examples, modified common content position is calculated or determined (block 819). This is carried out, in some examples, by ASC position calculator 410. In some examples, this calculation is based at least on the common content time position, on the maintaining of the time position of the reference signal 307 and on the predicted audio delay.

The flow continues A to FIG. 8B.

According to some examples, the reference and captured signals are synchronized to the modified common content position (block 825). This is carried out, in some examples, by shared content synchronizer module 413. In some examples this synchronization is performed to ensure that a time position of the synchronized reference signal is maintained, within the defined level of delay, relative to the captured signal. In some examples, the time position of the synchronized reference signal is ahead of a second time position of the captured signal. In some examples, this determines what frame of the reference signal 307, 532 should be at the head of the reference signal buffer 480 at any point in time.

According to some examples, the acoustic signal cancellation system receives or otherwise obtains 532, from an external source 160, 110, the reference signal 307 audio stream (block 830). This is carried out, in some examples, by headless player 417, e.g. utilizing reference signal interface 322. In some examples, this block is identical to block 730 of FIG. 7.

According to some examples, the audio stream of the reference signal 307 is decrypted (block 833). This is carried out, in some examples, by headless player 417. In some examples, the decryption utilizes the interface 536 to Digital Rights Management systems 377. The output is a decrypted audio stream. This step is required in cases where the audio stream 307 is encrypted. Where there is no encryption, this block is not required.

According to some examples, the audio stream of the reference signal 307 is decoded (block 835). This is carried out, in some examples, by headless player 417. If block 833 was performed, the decrypted audio stream is decoded.

According to some examples, the (decode) audio stream of the reference signal 307 is pushed 547 to the reference signal buffer 480 (block 837). This is carried out, in some examples, by headless player 417. In some examples, the frames stored in the buffer 480 are referred to herein as a synchronized reference signal 309.

According to some examples, the frame(s) at the head of the reference signal buffer 480 is sent to ASC Adaptive Filter 326 (block 840). This is carried out, in some examples, by the reference signal buffer 480, e.g. controlled by headless player 417 (block 840). In some examples, this block is identical to block 740 of FIG. 7.

According to some examples, standard AEC adaptive filter 226, 450 filters captured signal 519 (block 850). As indicated earlier, this step is optional, and provides the additional advantage of cancelling echo from Carla's 140 voice.

According to some examples, the error signal 554, resulting from the subtraction of the predicted far end signal 552 from the next frame(s) of captured signal 518, 519, is pushed 554 to the ASC adaptive filter 326 (block 855). In some examples, this block is identical to block 720 of FIG. 7. In some examples, the next frame(s) of captured signal 518, 519 is pushed 558 also to captured signal buffer 470, for use by signal correlator 430.

The flow continues B to FIG. 8C.

Not shown in this synchronization flow 800 is the actual filtering/cancellation/subtraction of the second acoustic signal 119 from the captured signal 518, 519. This step is described in block 730 of FIG. 7.

According to some examples, the actual audio delay is reported 570 (block 860). In some examples, this is performed by the ASC adaptive filter 326. In some examples, the ASC filter performance is reported. In some non-limiting examples, this reporting is sent to signal correlator 430. In some non-limiting examples, this reporting is instead, or is also, sent to ASC position calculator 410.

According to some examples, a correlation of the synchronized reference signal 309 with the captured signal 519, 518 is performed (block 870). In some examples, this is performed by signal correlator 430. The correlator is looking 560, 562 within the two buffers, for a correlation between the reference and captured signals. In some examples, the correlator 430 determines the actual delay between the two signals.

According to some examples, the head of the reference signal buffer 480 is tuned 573 (block 880). In some examples, this is performed by signal correlator 430. In some examples such a tuning facilitates maintenance of the defined level of delay.

According to some examples, a determination is made whether the time position of the reference signal 307, 309 is behind the second time position of the captured signal 518, 519 (block 890). In some examples, this is performed by the signal correlator 430, and/or by reference signal buffer 480.

In response to a determination that No, the time position of the reference signal is ahead of the second time position of the captured signal, the process in some examples ends (block 895).

In response to a determination that Yes, the time position of the reference signal behind ahead of the second time position of the captured signal, the process in some examples reverts C to block 817, and from there to 819, of FIG. 8A. The ASC position calculator 410 receives 577 information concerning the actual audio delay, and the time position of the reference and captured signal, from reference signal buffer 480, from signal correlator 430, and/or from ASC adaptive filter 326. The audio delay is re-estimated/ re-predicted, and the modified common content time position is re-calculated, by the position calculator 410, based at least on the actual audio delay. The processes of FIGS. 8B and 8C then are performed again.

In some examples, blocks 860-890 and C are part of a process of monitoring the actual audio delay between an availability time of the captured signal, and monitoring the distance of the synchronized reference signal 309 from the modified common time position.

Although in the figure the last step is "End" 895, for ease of exposition, in some examples the monitoring process is performed continually, during the viewing/consumption of the content. In some examples, such a process can ensure that the signals synchronization is maintained throughout, even when e.g. internet transmission delays may change during the TV show.

In some embodiments, one or more steps of the flowchart exemplified herein may be performed automatically. The flow and functions illustrated in the flowchart figures may for example be implemented in systems 110, 120, 143, 147, 160, 370, 377 and in processing circuitries 315, and may make use of components described with regard to FIGS. 3 to 5. It is also noted that whilst the flowchart is described with reference to system elements that realize steps, such as for example systems 305, 410, 470, and processing circuitry 315, this is by no means binding, and the operations can be carried out by elements other than those described herein.

It is noted that the teachings of the presently disclosed subject matter are not bound by the flowcharts illustrated in the various figures. The operations can occur out of the illustrated order. One or more stages illustrated in the figures can be executed in a different order and/or one or more groups of stages may be executed simultaneously. For example, steps 720 and 730, shown in succession, can be executed substantially concurrently, or in a different order. For example, steps 840, 850 and 855, shown in succession, can be executed substantially concurrently, or in a different order.

Similarly, some of the operations or steps can be integrated into a consolidated operation, or can be broken down into several operations, and/or other operations may be added. As a non-limiting example, in some cases blocks 883 and 835 can be combined.

In embodiments of the presently disclosed subject matter, fewer, more and/or different stages than those shown in the figures can be executed. As one non-limiting example, certain implementations may not include blocks 833 and/or 850.

In the claims that follow, alphanumeric characters and Roman numerals, used to designate claim elements such as components and steps, are provided for convenience only, and do not imply any particular order of performing the steps.

It should be noted that the word "comprising" as used throughout the appended claims, is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter, or any part thereof. The presently disclosed subject matter further contemplates a non-transitory machine-readable or computer-readable memory tangibly embodying a program of instructions executable by the machine or computer for executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A computerized acoustic signal cancellation system, comprising a processing circuitry, configured to perform a method comprising the following actions:
   a. provide a user device, associated with the acoustic signal cancellation system, and an audio capture device associated with the user device and operatively coupled to the acoustic signal cancellation system;
   b. receive at the acoustic signal cancellation system a captured signal indicative of a captured acoustic signal, wherein the captured acoustic signal is received at the audio capture device,
   wherein the captured acoustic signal comprises a second acoustic signal which is generated by a second device, the second device being external to the user device;
   c. receive, at the acoustic signal cancellation system, from an external source, a reference signal, the reference signal being indicative of a content that is included in the second acoustic signal;
   d. in a case that a content of the reference signal and the content that is included in second acoustic signal are not time-synchronized, generate a synchronized reference signal, based on the reference signal, such that a content of the synchronized reference signal and the content that is included in second acoustic signal are time-synchronized;
   e. in a case that a content of the reference signal and the content that is included in second acoustic signal are time-synchronized, set the reference signal to constitute the synchronized reference signal; and
   f. perform acoustic signal cancelling of a portion of the captured signal which corresponds to the second acoustic signal, based on the synchronized reference signal, thereby generating a reduced captured signal, thereby facilitating output of the reduced captured signal to a third device.

2. The computerized acoustic signal cancellation system of claim 1, the method further comprising:
   g. outputting the reduced captured signal to the third device, the third device being operatively coupled to the user device.

3. The computerized acoustic signal cancellation system of claim 1, wherein the captured acoustic signal and the reference signal are associated with a same broadcast of audio content.

4. The computerized acoustic signal cancellation system of claim 1, wherein the second device is configured to play audio-visual media, and the second device comprises a loudspeaker acoustic output.

5. The computerized acoustic signal cancellation system of claim 1, wherein the external source is the second device.

6. The computerized acoustic signal cancellation system of claim 1, wherein the acoustic signal cancellation system is comprised in the user device.

7. The computerized acoustic signal cancellation system of claim 1, wherein the audio capture device is a microphone.

8. The computerized acoustic signal cancellation system of claim 1, wherein the user device is one of a mobile phone, a tablet and a personal computer.

9. The computerized acoustic signal cancellation system of claim 1, wherein the second device is a television set.

10. The computerized acoustic signal cancellation system of claim 1, wherein the acoustic signal cancelling is performed using an acoustic signal cancelling filter.

11. The computerized acoustic signal cancellation system of claim 1, wherein the generation of the synchronized reference signal comprises performing synchronization of the captured signal with the reference signal, the synchronized reference signal having a defined level of delay relative to the captured signal.

12. The computerized acoustic signal cancellation system of claim 11, wherein the method further comprising performing the following step:

h. receiving one or more items of synchronization information associating the second acoustic signal with the reference signal,
wherein the performing of the synchronization is based at least on the one or more items of synchronization information.

13. The computerized acoustic signal cancellation system of claim 11,
wherein the user device and the second device are synchronized to a common content time position,
the common content time position being associated with a shared consumption of a common content by the user device and the second device,
wherein the second acoustic signal is associated with the common content,
wherein the generation of the synchronized reference signal is based on maintaining a time position of the synchronized reference signal, within the defined level of delay, wherein the time position of the synchronized reference signal is ahead of a second time position of the captured signal,
wherein the synchronization comprises tuning at least one signal buffer.

14. The computerized acoustic signal cancellation system of claim 13, wherein the synchronization comprises performing the following steps:
   i. predicting an audio delay associated with the captured signal, the predicted audio delay being indicative of a time of availability of the captured signal for the acoustic signal cancelling; and
   ii. calculating a modified common content position,
   wherein the calculation of the modified common content position is based at least on the common content time position, on the maintaining of the time position of the reference signal and on the predicted audio delay,
   wherein the synchronization of the portion of the captured signal with the reference signal is based on the modified common content position.

15. The computerized acoustic signal cancellation system of claim 14, wherein the calculation of the modified common content position is based at least on one or more of: a distance in time of the second device from the common content position; a threshold distance associated with the shared consumption of the content.

16. The computerized acoustic signal cancellation system of claim 14, wherein the synchronization further comprises performing the following step:
   iii. monitoring an actual audio delay between an availability time of the captured signal and a distance in time of the synchronized reference signal from the modified common time position.

17. The computerized acoustic signal cancellation system of claim 16, wherein the synchronization further comprises performing the following step:
   iv. in response to determining that the time position of the reference signal is behind the second time position of the captured signal, performing again said steps (i) and (ii), based on the actual audio delay.

18. A computerized acoustic signal cancellation method, capable of being performed by a computerized acoustic signal cancellation system comprising a processing circuitry, the method comprising performing the following actions:
   a. provide a user device, associated with the acoustic signal cancellation system, and an audio capture device associated with the user device and operatively coupled to the acoustic signal cancellation system;
   b. receive at the acoustic signal cancellation system a captured signal indicative of a captured acoustic signal,
   wherein the captured acoustic signal is received at the audio capture device,
   wherein the captured acoustic signal comprises a second acoustic signal which is generated by a second device, the second device being external to the user device;
   c. receive, at the acoustic signal cancellation system, from an external source, a reference signal,
   the reference signal being indicative of a content that is included in the second acoustic signal;
   d. in a case that a content of the reference signal and the content that is included in second acoustic signal are not time-synchronized,
   generate a synchronized reference signal, based on the reference signal, such that a content of the synchronized reference signal and the content that is included in second acoustic signal are time-synchronized;
   e. in a case that a content of the reference signal and the content that is included in second acoustic signal are time-synchronized,
   set the reference signal to constitute the synchronized reference signal; and
   f. perform acoustic signal cancelling of that portion of the captured signal which corresponds to the second acoustic signal, based on the synchronized reference signal, thereby generating a reduced captured signal,
   thereby facilitating output of the reduced captured signal to a third device.

19. A non-transitory computer readable storage medium tangibly embodying a program of instructions that, when executed by a computerized acoustic signal cancellation system, cause the computer to perform a computerized method, the method being performed by a processing circuitry of the computerized acoustic signal cancellation system and comprising performing the following actions:
   a. provide a user device, associated with the acoustic signal cancellation system, and an audio capture device associated with the user device and operatively coupled to the acoustic signal cancellation system;
   b. receive at the acoustic signal cancellation system a captured signal indicative of a captured acoustic signal,
   wherein the captured acoustic signal is received at the audio capture device,
   wherein the captured acoustic signal comprises a second acoustic signal which is generated by a second device, the second device being external to the user device;
   c. receive, at the acoustic signal cancellation system, from an external source, a reference signal,
   the reference signal being indicative of a content that is included in the second acoustic signal;
   d. in a case that a content of the reference signal and the content that is included in second acoustic signal are not time-synchronized,
   generate a synchronized reference signal, based on the reference signal, such that a content of the synchronized reference signal and the content that is included in second acoustic signal are time-synchronized;
   e. in a case that a content of the reference signal and the content that is included in second acoustic signal are time-synchronized,
   set the reference signal to constitute the synchronized reference signal; and
   f. perform acoustic signal cancelling of that portion of the captured signal which corresponds to the second acoustic signal, based on the synchronized reference signal, thereby generating a reduced captured signal, thereby facilitating output of the reduced captured signal to a third device.

* * * * *